(12) United States Patent
Nagahara et al.

(10) Patent No.: US 7,469,378 B2
(45) Date of Patent: Dec. 23, 2008

(54) LAYOUT SYSTEM, LAYOUT PROGRAM, AND LAYOUT METHOD

(75) Inventors: Atsushi Nagahara, Chino (JP); Hirotaka Ohashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 10/940,985

(22) Filed: Sep. 15, 2004

(65) Prior Publication Data

US 2005/0102617 A1    May 12, 2005

(30) Foreign Application Priority Data

Sep. 16, 2003  (JP)  ............................. 2003-323798
May 26, 2004  (JP)  ............................. 2004-156310

(51) Int. Cl.
    *G06F 17/00*    (2006.01)
(52) U.S. Cl. ........................ 715/243; 715/221; 715/224; 715/246
(58) Field of Classification Search ................ 715/517, 715/520, 521, 243, 221, 224, 246
    See application file for complete search history.

(56) References Cited

U.S. PATENT DOCUMENTS

| 5,633,996 | A  | * | 5/1997  | Hayashi et al. ............. 715/513 |
| 5,845,303 | A  | * | 12/1998 | Templeman ................. 715/517 |
| 5,999,664 | A  | * | 12/1999 | Mahoney et al. ............ 382/305 |
| 6,596,032 | B2 | * | 7/2003  | Nojima et al. .............. 715/517 |
| 7,107,525 | B2 | * | 9/2006  | Purvis ....................... 715/517 |
| 7,162,197 | B2 |   | 1/2007  | Kitamura |
| 2001/0003182 | A1 | * | 6/2001  | Labelle ......................... 707/3 |
| 2001/0051962 | A1 | * | 12/2001 | Plotkin ...................... 707/522 |
| 2004/0220898 | A1 | * | 11/2004 | Eguchi et al. ................. 707/1 |

FOREIGN PATENT DOCUMENTS

| JP | A-05-128106   | 5/1993 |
| JP | 2000-123173   | 4/2000 |
| JP | A 2001-228596 | 8/2001 |
| JP | A-2001-297080 | 10/2001 |
| JP | 2002-019219   | 1/2002 |
| JP | A-2002-170128 | 6/2002 |
| JP | 2002-297571   | 10/2002 |
| JP | A 2002-297570 | 10/2002 |

* cited by examiner

*Primary Examiner*—Stephen Hong
*Assistant Examiner*—Matthew J Ludwig
(74) *Attorney, Agent, or Firm*—Oliff & Berridge, PLC

(57) ABSTRACT

To provide a layout system suitable to implement layout with a high individuality. Layout result data of automatic layout processing is acquired as comparison destination layout result data. Business-type information, identical to business-type information corresponding to an input user ID, is retrieved from a user information registration database to read out a user ID corresponding to the associated business-type information. Comparison source layout result data, corresponding to the read-out user ID, is read out from layout result data registration database. Next, similarity between the comparison destination layout result data and the comparison source layout result data is calculated, and the comparison destination layout result data is corrected so that the degree of correction of the comparison destination layout result data increases as the calculated similarity increases.

10 Claims, 17 Drawing Sheets

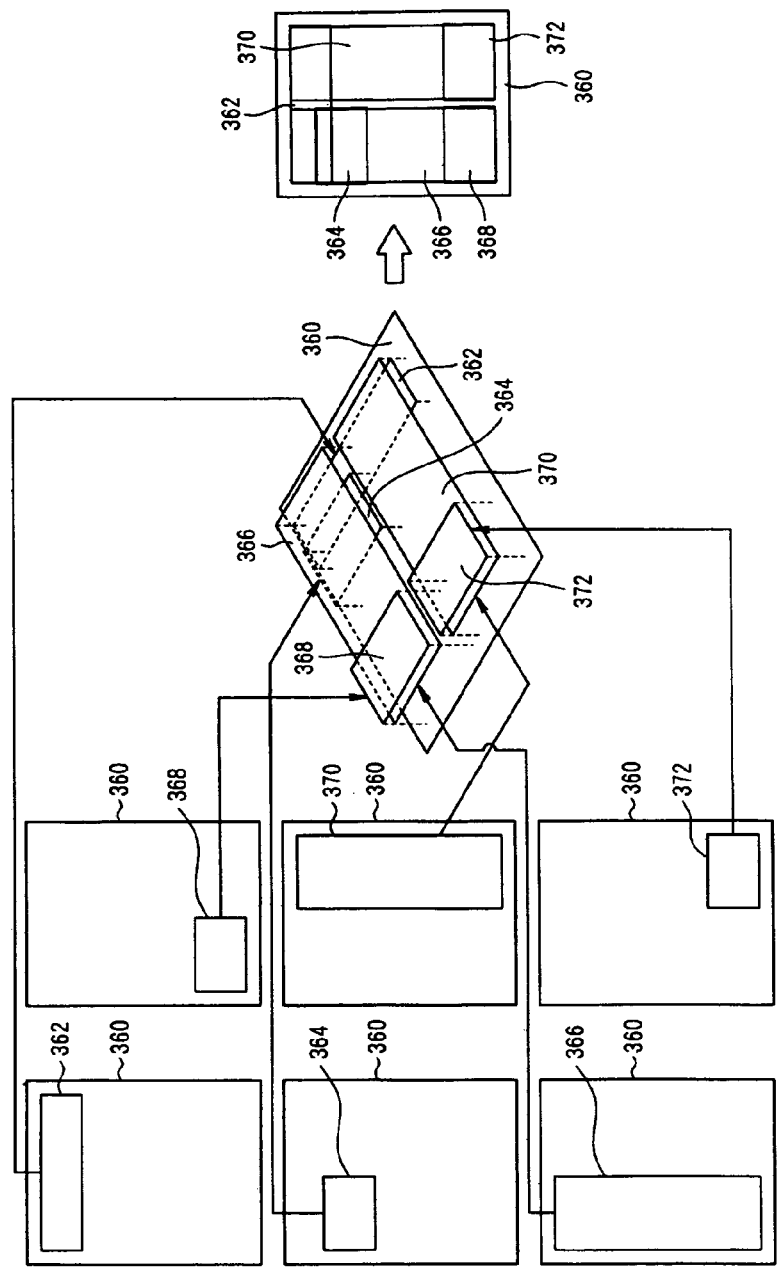

FIG. 4

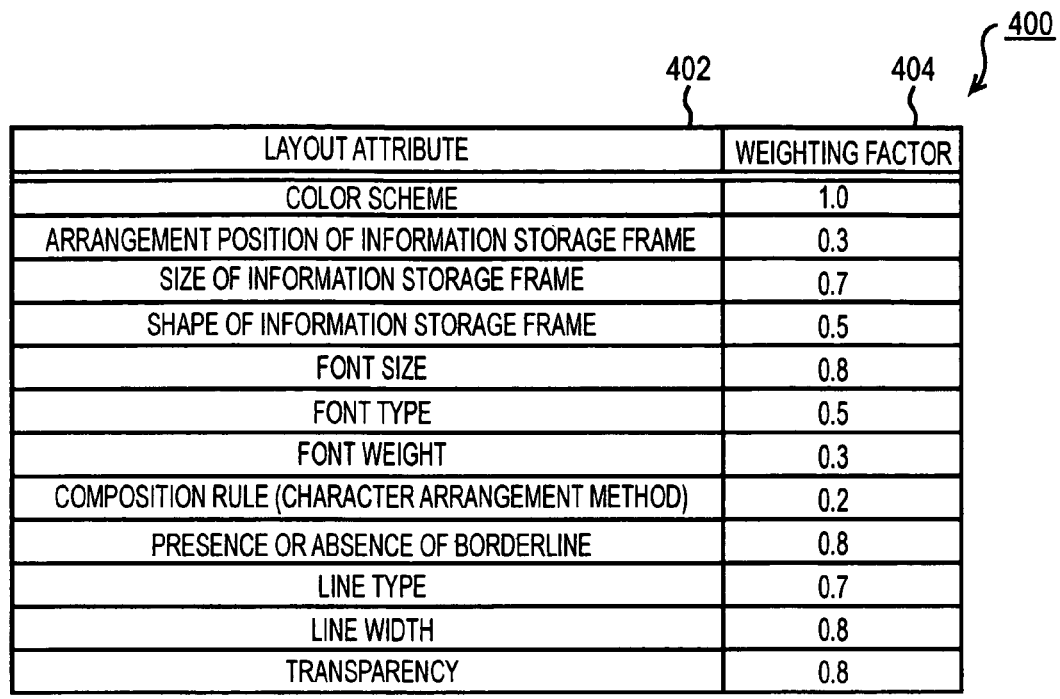

| LAYOUT ATTRIBUTE | WEIGHTING FACTOR |
|---|---|
| COLOR SCHEME | 1.0 |
| ARRANGEMENT POSITION OF INFORMATION STORAGE FRAME | 0.3 |
| SIZE OF INFORMATION STORAGE FRAME | 0.7 |
| SHAPE OF INFORMATION STORAGE FRAME | 0.5 |
| FONT SIZE | 0.8 |
| FONT TYPE | 0.5 |
| FONT WEIGHT | 0.3 |
| COMPOSITION RULE (CHARACTER ARRANGEMENT METHOD) | 0.2 |
| PRESENCE OR ABSENCE OF BORDERLINE | 0.8 |
| LINE TYPE | 0.7 |
| LINE WIDTH | 0.8 |
| TRANSPARENCY | 0.8 |

FIG. 5

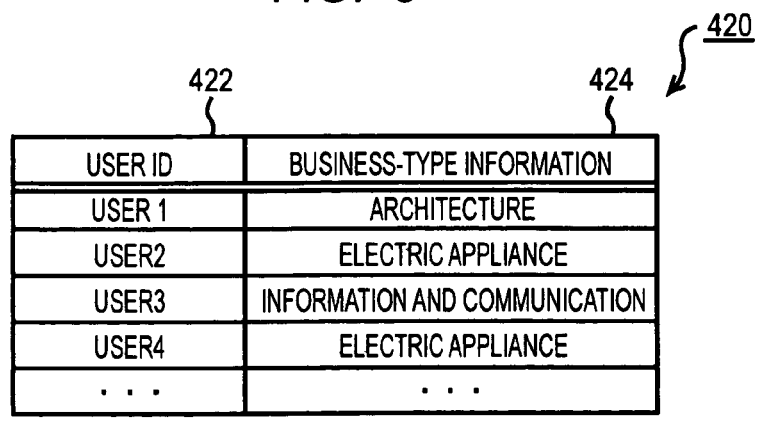

| USER ID | BUSINESS-TYPE INFORMATION |
|---|---|
| USER 1 | ARCHITECTURE |
| USER2 | ELECTRIC APPLIANCE |
| USER3 | INFORMATION AND COMMUNICATION |
| USER4 | ELECTRIC APPLIANCE |
| ... | ... |

| FILENAME | USER ID | DATE OF USE |
|---|---|---|
| LAYOUT1 | USER2 | 2002/6/10 |
| LAYOUT1 | USER1 | 2002/10/23 |
| LAYOUT3 | USER2 | 2002/12/11 |
| LAYOUT3 | USER3 | 2003/1/12 |
| LAYOUT5 | USER4 | 2003/1/20 |
| LAYOUT4 | USER1 | 2003/2/14 |
| ... | ... | ... |

COMPARISON DESTINATION LAYOUT RESULT DATA

COMPARISON SOURCE LAYOUT RESULT DATA 1

COMPARISON SOURCE LAYOUT RESULT DATA 2

COMPARISON SOURCE LAYOUT RESULT DATA 3

CORRECTED LAYOUT RESULT DATA

| LAYOUT ELEMENT | TYPE | FONT SIZE | FONT WEIGHT |
|---|---|---|---|
| TITLE 1 | TITLE INFORMATION STORAGE FRAME | 20 POINTS | 10 |
| TITLE 2 | TITLE INFORMATION STORAGE FRAME | 30 POINTS | 15 |
| TEXT 1 | CHARACTER INFORMATION STORAGE FRAME | 12 POINTS | 5 |
| TEXT 3 | CHARACTER INFORMATION STORAGE FRAME | 12 POINTS | 5 |
| TEXT 4 | CHARACTER INFORMATION STORAGE FRAME | 10 POINTS | 3 |
| TEXT 6 | CHARACTER INFORMATION STORAGE FRAME | 10 POINTS | 3 |

FIG. 19A
FIG. 19B
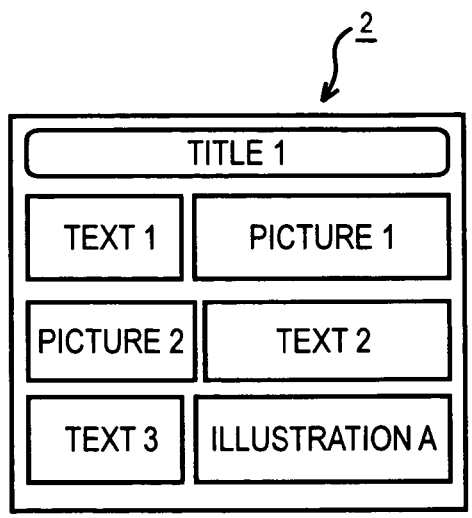
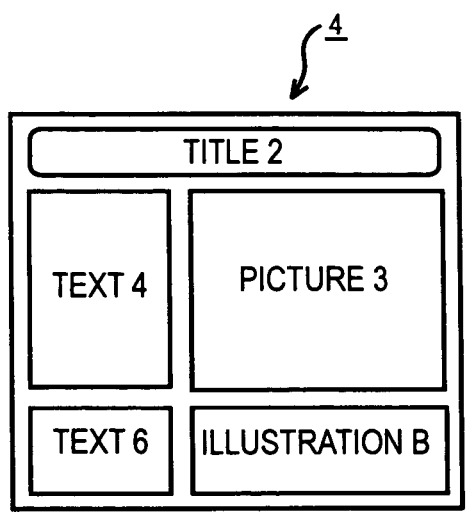

FIG. 21A
FIG. 21B
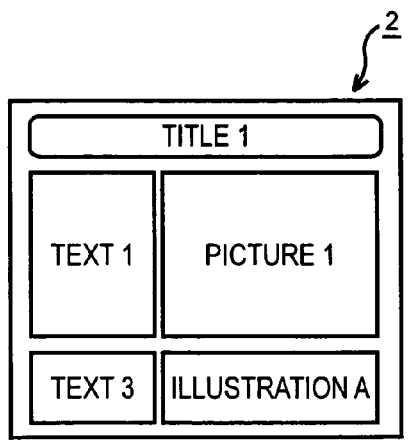
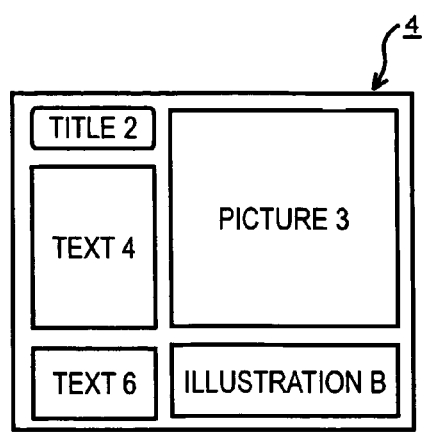
FIG. 22
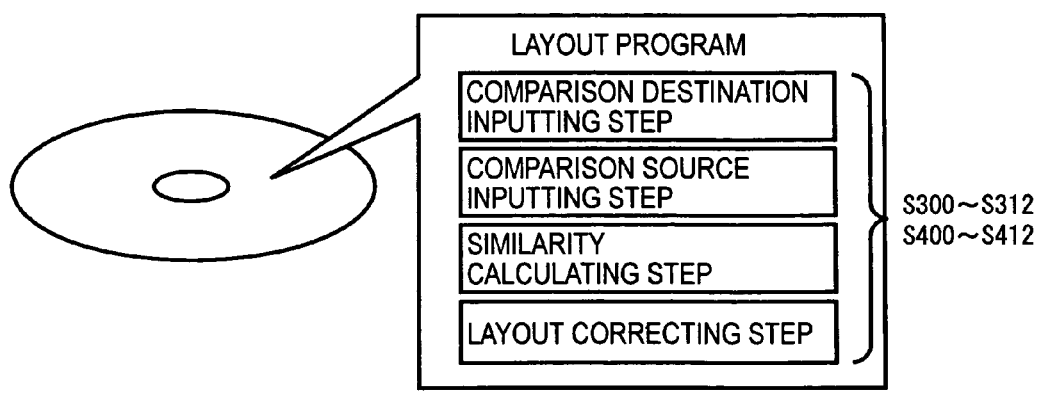

LAYOUT SYSTEM, LAYOUT PROGRAM, AND LAYOUT METHOD

BACKGROUND OF THE INVENTION

1. Field of Invention

Exemplary aspects of the present invention relate to a system, program, and method of performing layout, and particularly, to a layout system, a layout program, and a layout method suitable to implementing layout with a high individuality.

2. Description of Related Art

Related art automatic layout techniques include a newspaper space production system disclosed in Japanese Unexamined Patent Application Publication No. 2001-228596 and a digital contents production system disclosed in Japanese Unexamined Patent Application Publication No. 2002-297570.

In Japanese Unexamined Patent Application Publication No. 2001-228596, a composition edition server and plural composition terminals are communicably connected to each other. An element-occupied table to store element identification names of respective elements, during arrangement processing on respective spaces or already arranged on the respective spaces, is provided to the composition edition server. The respective composition terminals retrieve the element-occupied table by using the element identification names of the elements according to an arrangement operation of the elements, and output warnings of un-usability of the elements if the element identification names are retrieved. If the element identification names are not retrieved, the associated element identification names are registered in the element-occupied table. Then, the arrangement processing to arrange the associated elements on the spaces starts. The associated element identification names are deleted from the element-occupied table according to the completion of an arrangement deletion operation on the elements already arranged on the spaces.

In the invention disclosed in Japanese Unexamined Patent Application Publication No. 2002-297570, contents are selected from a contents registration database (hereinafter, "database" is referred to as "DB") based on user information. A variety of information constituting the selected contents are arranged in a layout region with predetermined sections. In consequence of the arrangement of the variety of information in the layout region, if there is a non-arrangement region in the layout region, any one of first to third information arrangement processing to arrange information in the non-arrangement region with respective different schemes is searched based on the size of the non-arrangement region, and the information is arranged in the non-arrangement region with the searched information arrangement processing.

SUMMARY OF THE INVENTION

In a case where the layout result data is provided to different users engaged in the same business type or a case where different users managing the same client provide the layout result data to the client, there is a need to perform different layouts, even if published contents are identical or similar to each other.

However, in Japanese Unexamined Patent Application Publication No. 2001-228596 and Japanese Unexamined Patent Application Publication No. 2002-297570, since only the layout is performed, similar layout is likely to be performed even in these cases.

Therefore, in order to address and/or solve the aforementioned and/or other problems, exemplary aspects of the present invention provide a layout system, a layout program, and a layout method suitable to implement layout with a high individuality.

First Exemplary Aspect

In order to achieve the above, a layout system of a first exemplary aspect is characterized in that the layout system includes: a correction-object input device to input correction-object layout result data as an object to be corrected; a comparison-object input device to input comparison-object layout result data as an object to be compared; a layout-result-data comparison device to compare the correction-object layout result data input by the correction-object input device with the comparison-object layout result data input by the comparison-object input device; and a layout correction device to correct the correction-object layout result data input by the correction-object input device based on a comparison result of the layout-result-data comparison device. The layout correction device corrects the correction-object layout result data so as not to be similar to the comparison-object layout result data based on the comparison result of the layout-result-data comparison device.

According to the construction, the correction-object layout result data is input by the correction-object input device, and the comparison-object layout result data is input by the comparison-object input device. In addition, the input correction-object layout result data and the input comparison-object layout result data are compared by the layout-result-data comparison device. The correction-object layout result data is corrected by the layout correction device so as not to be similar to the comparison-object layout result data based on the comparison result.

As a result, for example, in a case where the layout result data is provided to different users engaged in the same business type or a case where different users managing the same client provide the layout result data to the client, if the layout result data provided by the one user is input as the correction-object layout result data and the layout result data provided by another user is input as the comparison-object layout result data, since the layout result data provided by the one user is corrected so as not to be similar to the layout result data provided by another user, it is possible to implement layout with a high individuality in comparison with the related art.

Here, the layout correction device may have any construction to correct the correction-object layout result data. For example, the correction may be performed in accordance with user's commands, or the correction may be automatically performed in accordance with a predetermined correction method. Hereinafter, it is the same as those of layout systems of second and seventh exemplary aspects.

In addition, the layout result data denotes data constituting results obtained by performing layout.

The "layout" denotes a display layout in a case where layout is performed to be displayed on a screen and a print layout in a case where layout is preformed to be printed on a paper. Hereinafter, it is the same as those of layout systems according to the second and seventh exemplary aspects, layout programs according to eighth and thirteenth exemplary aspects, and layout methods according to fourteenth and nineteen to twenty-first exemplary aspects.

The "input" includes acquiring the correction-object layout result data or the comparison-object layout result data from storage device. As the correction-object layout result data or the comparison-object layout result data, for example, layout result data laid out by a layout system having a layout selection device and a layout device, layout result data designed by a designer using design software, etc., and commercially available layout result data can be used. Layout result data obtained by converting printed materials, such as poster printed on a paper medium, into electrical data with a scanner or a digital camera and subjected to image analysis processing can be used. This is the same layout system according to the second and seventh exemplary aspects, layout programs according to the eighth and thirteenth exemplary aspects, and layout methods according to the fourteenth and nineteen to twenty-first exemplary aspects.

The present system may be implemented with a terminal or other apparatus or with a network system communicably connecting a plurality of apparatus or terminals or other apparatus. In case of the latter, each of the components may constitute any one of the plurality of apparatus, etc., if they are communicably connected. Hereinafter, this is true of layout systems according to the second and seventh exemplary aspects.

Second Exemplary Aspect

A layout system according to a second exemplary aspect includes: a layout-element selection device to select a layout element from a layout-element storage device to store a plurality of the layout elements; a layout device to arrange the layout element selected by the layout-element selection device in a predetermined layout region; a correction-object input device to input layout result data of the layout device as correction-object layout result data; a comparison-object input device to input comparison-object layout result data as an object to be compared; a similarity calculation device to calculate similarity between the correction-object layout result data input by the correction-object input device and the comparison-object layout result data input by the comparison-object input device; and a layout correction device to correct the correction-object layout result data input by the correction-object input device based on the similarity calculated by the similarity calculation device. The layout correction device corrects the correction-object layout result data so that the degree of correction of the correction-object layout result data increases as the similarity calculated by the similarity calculation device increases.

According to the above construction, the layout element is selected from the layout-element storage device by the layout-element selection device. The selected layout element is arranged in a predetermined region by the layout device. Next, the layout result data of the layout device is input as the correction-object layout result data by the correction-object input device. The comparison-object layout result data is input by the comparison-object input device. Next, the similarity between the input correction-object layout result data and the input comparison-object layout result data is calculated by the similarity calculation device. The correction-object layout result data is corrected by the layout correction device so that the degree of correction of the correction-object layout result data increases as the calculated similarity increases.

As a result, for example, in a case where the layout result data is provided to different users engaged in the same business type or a case where different users managing the same client provide the layout result data to the client, if the layout result data provided by the one user is input as the correction-object layout result data and the layout result data provided by another user is input as the comparison-object layout result data, since the layout result data provided by the one user is corrected so that the degree of correction thereof increases as the similarity to layout result data provided by another user increases, it is possible to implement layout with a high individuality in comparison with the related art.

Here, the "degree of correction" denotes the number of positions where a layout is corrected or a level of correction. Hereinafter, it is the same as a layout system according to the seventh exemplary aspect, layout programs according to the eighth and thirteenth exemplary aspects, and layout methods according to the fourteenth and nineteen to twenty-first exemplary aspects.

The "layout element" includes character information, image information, or other elements capable of constituting layout. Hereinafter, it is the same as a layout program of eighth exemplary aspect, and layout methods according to fourteenth and twentieth exemplary aspects.

The "layout result data" denotes data representing a layout state where the layout elements are arranged in a predetermined layout region. Hereinafter, it is the same as a layout system according to the seventh exemplary aspect, layout programs according to the eighth and thirteenth exemplary aspects, and layout methods according to the fourteenth and nineteen to twenty-first exemplary aspects.

The layout-element storage device may store the layout elements by any device and at any time. The layout-element storage device may store the layout elements in advance. Without storing in advance, the layout-element storage device may store the layout elements at the time of the operation of the present system in accordance with an external input or the like.

Third Exemplary Aspect

A layout system according to a third exemplary aspect is characterized in that, in the layout system according to the second aspect, the layout system further includes a layout-result-data registration device to register in a layout-result-data storage device the layout result data of the layout device or the correction-object layout result data corrected by the layout correction device as the comparison-object layout result data. The comparison-object input device reads out the correction-object layout result data from the layout-result-data storage device.

According to the construction, the layout result data of the layout device or the corrected correction-object layout result data is registered as the comparison-object layout result data in the layout-result-data storage device by the layout-result-data registration device. The comparison-object layout result data is read out from the layout-result-data storage device by the comparison-object input device.

As a result, since the past layout result data can be used as the comparison-object layout result data, it is possible to implement layout with high individuality for the layout result data which was previously provided to the user engaged in the same business type or the layout result data which another user managing the same client previously provided to the client.

Fourth Exemplary Aspect

A layout system according to a fourth exemplary aspect is characterized in that, in the layout system according to the third exemplary aspect, the layout system further includes a user-information storage device to store user information on a user in correspondence with user identification information; and user-identification-information input device to input the user identification information. The layout-result-data registration device registers the comparison-object layout result data in the layout-result-data storage device in correspondence with the user identification information input by the user-identification-information input device. The comparison-object input device retrieves user information identical to or similar to the user information corresponding to the user identification information input by the user-identification-information input device from the user-information storage device to read out user identification information corresponding to the associated user information, and reads out comparison-object layout result data corresponding to the read-out user identification information from the layout-result-data storage device.

According to the construction, when the user identification information is input by the user-identification-information input device, the comparison-object layout result data is registered in the layout-result-data storage device in correspondence with the input user identification information by the layout-result-data registration device. The user information identical to or similar to the user information corresponding to the input user identification information is retrieved by the comparison-object input device to read out the user identification information corresponding to the associated user information. The comparison-object layout result data corresponding to the read-out user identification information is read out from the layout-result-data storage device.

As a result, it is possible to implement a layout with a high individuality for the layout result data that was previously provided to the user or other providers associated with the user information identical to or similar to the user information.

The user-information storage device may store the user information by any means and at any time. The user-information storage device may store the user information in advance. Without storing in advance, the user-information storage device may store the user information at the time of the operation of the present system in accordance with an external input or the like.

Fifth Exemplary Aspect

A layout system of a fifth exemplary aspect is characterized in that, in the layout system of the fourth exemplary aspect, the user information includes business-type information indicating a business type in which the user is engaged.

According to the construction, the business-type information identical to or similar to the business-type information corresponding to the input user identification information is retrieved from the user-information storage device by the comparison-object input device to read out the user identification information corresponding to the associated business-type information. The comparison-object layout result data corresponding to the read-out user identification information is read out from the layout-result-data storage device.

As a result, it is possible to implement a layout with a high individuality for the layout result data that was previously provided to the user engaged in the identical or similar business type.

Sixth Exemplary Aspect

A layout system according to a sixth exemplary aspect is characterized in that, in the layout system according to the fourth exemplary aspect, the user information includes client identification information to identify clients managed by the user.

According to the construction, the client information identical to or similar to the client information corresponding to the input user identification information is retrieved from the user-information storage device by the comparison-object input device to read out the user identification information corresponding to the associated client information. The comparison-object layout result data corresponding to the read-out user identification information is read out from the layout-result-data storage device.

As a result, it is possible to implement layout with a high individuality for the layout result data that the user managing the identical or similar client previously provided to the client.

Seventh Exemplary Aspect

A layout system according to a seventh exemplary aspect is characterized in that the layout system includes: a correction-object input device to input correction-object layout result data as an object to be corrected; a comparison-object input device to input comparison-object layout result data as an object to be compared; similarity calculation device to calculate similarity between the correction-object layout result data input by the correction-object input device and the comparison-object layout result data input by the comparison-object input device; and a layout correction device to correct the correction-object layout result data input by the correction-object input device based on the similarity calculated by the similarity calculation device. The layout correction device corrects the correction-object layout result data so that the degree of correction of the correction-object layout result data increases as the similarity calculated by the similarity calculation device increases.

According to the construction, the correction-object layout result data is input by the correction-object input device, and the comparison-object layout result data is input by the comparison-object input device. Next, the similarity between the input correction-object layout result data and the input comparison-object layout result data is calculated by the similarity calculation device, and the correction-object layout result data is corrected by the layout correction device so that the degree of correction of the correction-object layout result data increases as the calculated similarity increases.

As a result, for example, in a case where the layout result data is provided to different users engaged in the same business type or a case where different users managing the same client provide the layout result data to the client, if the layout result data provided by the one user is input as the correction-object layout result data and the layout result data provided by another user is input as the comparison-object layout result data, since the layout result data provided by the one user is corrected so that the degree of correction thereof increases as the similarity to layout result data provided by another user increases, it is possible to implement layout with a high individuality in comparison with the related art.

Eighth Exemplary Aspect

In order to achieve the above, a layout program according to an eighth exemplary aspect is characterized in that the layout program, executed by a computer, includes: a layout-element selecting step of selecting a layout element from layout-element storage device to store a plurality of the layout elements; a layout step of arranging the layout element selected in the layout-element selecting step in a predetermined layout region; a correction-object inputting step of inputting layout result data obtained in the layout step as correction-object layout result data; a comparison-object inputting step of inputting comparison-object layout result data as an object to be compared; a similarity calculating step of calculating similarity between the correction-object layout result data input in the correction-object inputting step and the comparison-object layout result data input in the comparison-object inputting step; and a layout-correcting step of correcting the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

According to the construction, the program is read out by the computer, and the computer performs processes according to the read-out program, so that it is possible to obtain functions and effects equivalent to those of the layout system according to the second exemplary aspect.

Here, the layout-correcting step may include any method of correcting the correction-object layout result data. For example, the correction may be performed in accordance with user's commands, or the correction may be automatically performed in accordance with a predetermined correction method. Hereinafter, it is the same as those of a layout program according to the thirteenth exemplary aspect and layout methods of the fourteenth, and nineteenth to twenty-first exemplary aspects.

Ninth Exemplary Aspect

A layout program according to a ninth exemplary aspect is characterized in that, in the layout program according to the eighth exemplary aspect, the layout program executed by a computer further includes a layout result data registration step of registering the layout result data obtained in the layout step or the correction-object layout result data corrected in the layout-correcting step as the comparison-object layout result data in layout-result-data storage device. The correction-object layout result data are read out in the comparison-object inputting step from the layout-result-data storage device.

According to the construction, the program is read out by the computer, and the computer performs processes according to the read-out program, so that it is possible to obtain functions and effects equivalent to those of the layout system according to the third exemplary aspect.

Tenth Exemplary Aspect

A layout program according to a tenth exemplary aspect is characterized in that, in the layout program according to the ninth exemplary aspect, the layout program executed by a computer further includes a user identification information input step of inputting user identification information, the layout result data registration step registers the comparison-object layout result data in the layout-result-data storage device in correspondence with the user identification information input in the user identification information input step. The comparison-object inputting step retrieves user information identical or similar to the user information corresponding to the user identification information input in the user identification information input step from the user-information storage device to read out user identification information corresponding to the associated user information, and reads out comparison-object layout result data corresponding to the read-out user identification information from the layout-result-data storage device.

According to the construction, the program is read out by the computer, and the computer performs processes according to the read-out program, so that it is possible to obtain functions and effects equivalent to those of the layout system of the fourth exemplary aspect.

Eleventh Exemplary Aspect

A layout program according to an eleventh exemplary aspect is characterized in that, in the layout program according to the tenth exemplary aspect, the user information includes business-type information indicating a business type in which the user is engaged.

According to the construction, the program is read out by the computer, and the computer performs processes according to the read-out program, so that it is possible to obtain functions and effects equivalent to those of the layout system of fifth exemplary aspect.

Twelfth Exemplary Aspect

A layout program according to a twelfth exemplary aspect is characterized in that, in the layout program according to the tenth exemplary aspect, the user information includes client identification information to identify clients managed by the user.

According to the construction, the program is read out by the computer, and the computer performs processes according to the read-out program, so that it is possible to obtain functions and effects equivalent to those of the layout system according to the sixth exemplary aspect.

Thirteenth Exemplary Aspect

A layout program according to a thirteenth exemplary aspect is characterized in that the layout program includes: a correction-object inputting step of inputting correction-object layout result data as an object to be corrected; a comparison-object inputting step of inputting comparison-object layout result data as an object to be compared; a similarity calculating step of calculating similarity between the correction-object layout result data input in the correction-object inputting step and the comparison-object layout result data input in the comparison-object inputting step; and a layout-correcting step of correcting the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

According to the construction, the program is read out by the computer, and the computer performs processes according to the read-out program, so that it is possible to obtain functions and effects equivalent to those of the layout system according to the seventh exemplary aspect.

Fourteenth Exemplary Aspect

In order to achieve the above, a layout method of a fourteenth exemplary aspect is characterized in that the layout method includes: a layout-element selecting step of selecting a layout element from a layout-element storage device to store a plurality of the layout elements; a layout step of arranging the layout element selected in the layout-element selecting step in a predetermined layout region; a correction-object inputting step of inputting layout result data obtained in the layout step as correction-object layout result data; a comparison-object inputting step of inputting comparison-object layout result data as an object to be compared; a similarity calculating step of calculating similarity between the correction-object layout result data input in the correction-object inputting step and the comparison-object layout result data input in the comparison-object inputting step; and a layout-correcting step of correcting the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

As a result, it is possible to obtain effects equivalent to those of the layout system according to the second exemplary aspect.

Fifteenth Exemplary Aspect

A layout method according to the fifteenth exemplary aspect is characterized in that, in the layout method according to the fourteenth exemplary aspect, the layout method further includes a layout result data registration step of registering the layout result data obtained in the layout step or the correction-object layout result data corrected in the layout-correcting step as the comparison-object layout result data in layout-result-data storage device. The correction-object layout result data are read out in the comparison-object inputting step from the layout-result-data storage device.

As a result, it is possible to obtain effects equivalent to those of the layout system the third exemplary aspect.

Sixteenth Exemplary Aspect

A layout method according to a sixteenth exemplary aspect is characterized in that, in the layout method according to the fifteenth exemplary aspect, the layout method further includes a user identification information input step of inputting user identification information. The layout result data registration step registers the comparison-object layout result data in the layout-result-data storage device in correspondence with the user identification information input in the user identification information input step. The comparison-object inputting step retrieves user information identical to or similar to the user information corresponding to the user identification information input in the user identification information input step from the user-information storage device to read out user identification information corresponding to the associated user information, and reads out comparison-object layout result data corresponding to the read-out user identification information from the layout-result-data storage device.

As a result, it is possible to obtain effects equivalent to those of the layout system of the fourth exemplary aspect.

Seventeenth Exemplary Aspect

A layout method according to a seventeenth exemplary aspect is characterized in that, in the layout method according to the sixteenth exemplary aspect, the user information includes business-type information indicating a business type in which the user is engaged.

As a result, it is possible to obtain effects equivalent to those of the layout system of fifth exemplary aspect.

Eighteenth Exemplary Aspect

A layout method according to an eighteenth exemplary aspect is characterized in that, in the layout method according to the sixteenth exemplary aspect, the user information includes client identification information to identify clients managed by the user.

As a result, it is possible to obtain effects equivalent to those of the layout system according to the sixth exemplary aspect.

Nineteenth Exemplary Aspect

A layout method according to a nineteenth exemplary aspect is characterized in that the layout method includes: a correction-object inputting step of inputting correction-object layout result data as an object to be corrected; a comparison-object inputting step of inputting comparison-object layout result data as an object to be compared; a similarity calculating step of calculating similarity between the correction-object layout result data input in the correction-object inputting step and the comparison-object layout result data input in the comparison-object inputting step; and a layout-correcting step of correcting the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

As a result, it is possible to obtain effects equivalent to those of the layout system of the seventh exemplary aspect.

Twentieth Exemplary Aspect

A layout method of a twentieth exemplary aspect is characterized in that the layout method includes: a layout-element selecting step of allowing a layout-element selection device to select a layout element from a layout-element storage device to store a plurality of the layout elements; a layout step of allowing a layout device to arrange the layout element selected in the layout-element selecting step in a predetermined layout region; a correction-object inputting step of allowing a correction-object input device to input layout result data obtained in the layout step as correction-object layout result data; a comparison-object inputting step of allowing a comparison-object input device to input comparison-object layout result data as an object to be compared; a similarity calculating step of allowing similarity calculation device to calculate similarity between the correction-object layout result data input in the correction-object inputting step and the comparison-object layout result data input in the comparison-object inputting step; and a layout-correcting step of allowing a layout correction device to correct the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

As a result, it is possible to obtain effects equivalent to those of the layout system of the second exemplary aspect.

Twenty-first Exemplary Aspect

A layout method according to a twenty-first exemplary aspect is characterized in that the layout method includes: a correction-object inputting step of allowing a correction-object input device to input correction-object layout result data as an object to be corrected; a comparison-object inputting step of allowing a comparison-object input device to input comparison-object layout result data as an object to be compared; a similarity calculating step of allowing similarity calculation device to calculate a similarity between the correction-object layout result data input in the correction-object inputting step and the comparison-object layout result data input in the comparison-object inputting step; and a layout-correcting step of allowing layout correction device to correct the correction-object layout result data input in the correction-object inputting step based on the similarity calculated in the similarity calculating step. The correction-object layout result data is corrected in the layout-correcting step so that the degree of correction of the correction-object layout result data increases as the similarity calculated in the similarity calculating step increases.

As a result, it is possible to obtain effects equivalent to those of the layout system of the seventh exemplary aspect.

BRIEF DESCRIPTION OF THE DRAWINGS

FIG. 3 is a schematic showing the data structure of a layout template;

FIG. 4 is a schematic showing the data structure of a layout attribute table 400;

FIG. 5 is a schematic showing the data structure of a user information registration table 420;

FIG. 19 is a schematic showing the comparison destination layout result data 2 and the comparison source layout result data 4;

FIG. 21 is a schematic showing the comparison destination layout result data 2 and the comparison source layout result data 4; and FIG. 22 is a schematic showing a recording medium and a data structure thereof.

DETAILED DESCRIPTION OF EXEMPLARY EMBODIMENTS

Now, a first exemplary embodiment of the present invention will be described with reference to the drawings. FIGS. 1 to 15 are schematics showing the first exemplary embodiment of a layout system, a layout program, and a layout method according to the present invention.

In the exemplary embodiment, the layout system, the layout program and the layout method are adapted to a case where layout result data of automatic layout processing is corrected.

First, the summary of functions of a layout apparatus 100 to which exemplary aspects of the present invention is applied to will be described in detail with reference to FIG. 1.

Figure 1:
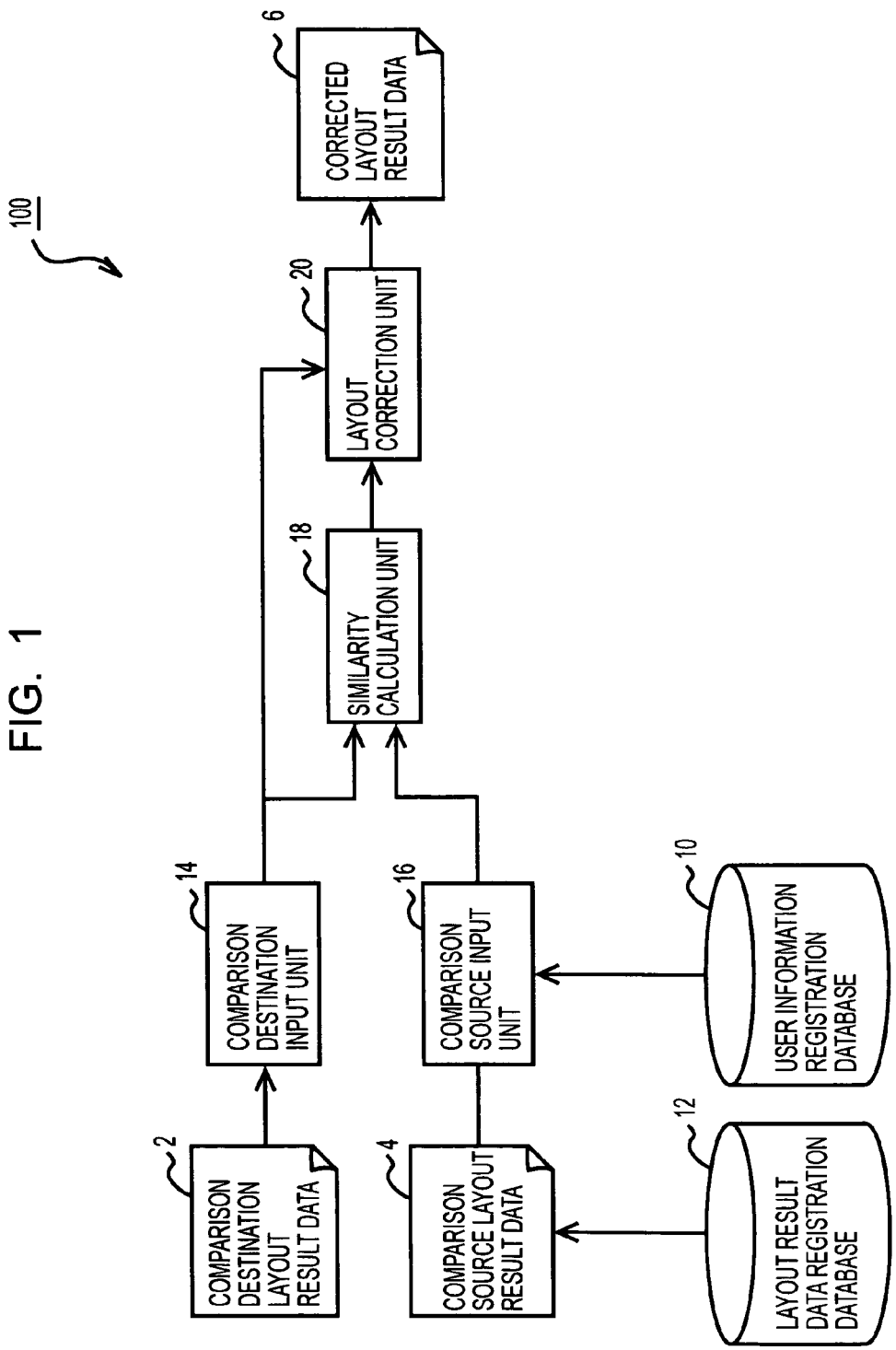
FIG. 1 is a schematic showing the summary of functions of a layout apparatus 100.

FIG. 1 is a schematic showing the summary of functions of the layout apparatus 100.

As shown in FIG. 1, the layout apparatus 100 includes user information registration DB 10 to register user information on users, layout result data registration DB 12 to register plural comparison source layout result data 4, a comparison destination input unit 14 to input comparison destination layout result data 2, a comparison source input unit 16 to input the comparison source layout result data 4 from the layout result data registration DB 12 based on the user information of the user information registration DB 10, a similarity calculation unit 18 to calculate similarity between the comparison destination layout result data 2 input by the comparison destination input unit 14 and the comparison source layout result data 4 input by the comparison source input unit 16, and a layout correction unit 20 to correct the comparison destination layout result data 2 according to the similarity calculated by the similarity calculation unit 18.

The user information registration DB 10 registers the user information indicating a business type of a user in correspondence with a user ID.

The layout result data registration DB 12 registers the comparison source layout result data 4 in correspondence with the user ID.

The comparison source input unit 16 retrieves a user ID of another user engaged in the same business type as that of the current user using corrected layout result data 6 from the user information registration DB 10, and reads out the comparison source layout result data 4 corresponding to the retrieved user ID from the layout result data registration DB 12.

The layout correction unit 20 corrects the comparison destination layout result data 2, so that the degree of correction of the comparison destination layout result data 2 increases as the similarity calculated by the similarity calculation unit 18 increases.

Next, the construction of the layout apparatus 100 will be described with reference to FIG. 2.

Figure 2:
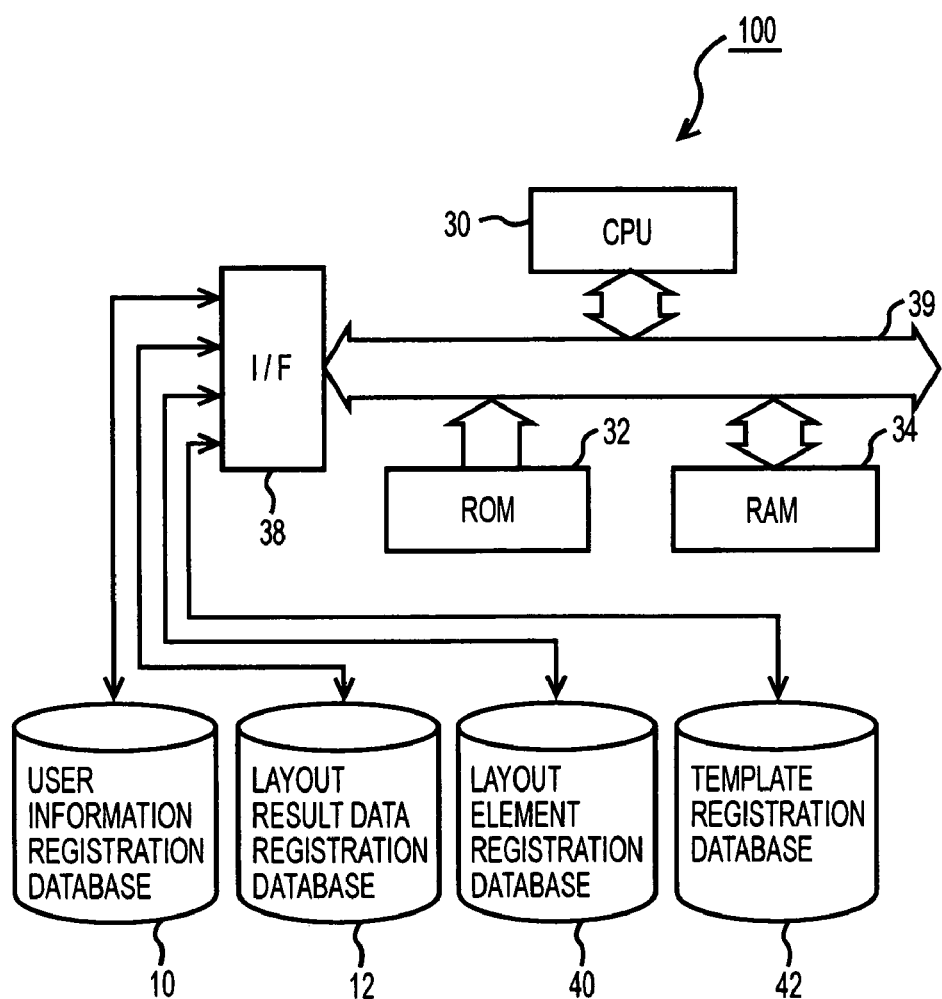
FIG. 2 is a schematic showing the construction of the layout apparatus 100.

FIG. 2 is a schematic showing the construction of the layout apparatus 100.

As shown in FIG. 2, the layout apparatus 100 includes a CPU 30 to control arithmetic operations and whole systems based on a control program, a ROM 32 to previously store the control program, etc., of the CPU 30 in a predetermined region, a RAM 34 to store data read out from the ROM 32, etc., or results of the arithmetic operations needed for arithmetic processing of the CPU 30, and an I/F 38 to interface with external devices in order to input or output data from or to the external devices. These components are connected to communicate data therebetween via a bus 29, that is, a signal line to transmit the data.

The external devices, such as the user information registration DB 10, the layout result data registration DB 12, layout element registration DB 40 to register plural kinds of character information, image information, title information, and other elements constituting layout (hereinafter, layout elements), and template registration DB 42 to register a plurality of layout templates are connected to the I/F 38.

Next, the data structure of the template registration DB 42 will be described in detail with reference to FIG. 3.

The template registration DB 42 registers the plurality of layout templates that define the layout in correspondence with filenames thereof. Each of the layout templates defines, for example, the size of an information storage frame to store the layout elements, an arrangement position thereof in the layout region, the size, type, and color of a font of character information, a character interval, line pitch, and the number, quality, size and ratio of images, and is described with an XML (eXtensible Markup Language), etc. In addition, although different layout templates have different data structures, a representative single one out of the layout templates is selected and described herein.

FIG. 3 is a schematic showing the data structure of the layout template.

The layout template has layout regions 360 for respective pages. As shown in FIG. 3, a title information storage frame 362 to store title information, an image information storage frame 364 to store image information, a character information storage frame 366 to store character information, an image information storage frame 368, a character information storage frame 370, and a flow object storage frame 372 to store a flow object are arranged in one of the layout regions 360. Here, the "flow object" denotes overflow character information or other overflow information that is not completely stored in an information storage frame for a previous page other than a current page.

The title information storage frame 362 is a rectangular frame having a width substantially equal to the transverse length of the layout region and a height of about ⅕ of the longitudinal length of the layout region, and an upper left corner thereof is located in the vicinity of upper left end portion of the layout region 360. The title information storage frame overlaps the image information storage frame 364, the character information storage frame 366, and the character information storage frame 370.

The image information storage frame 364 is a rectangular frame having a width being about ½ of the transverse length of the layout region and a height being about ¼ of the longitudinal length of the layout region. An upper left corner thereof is located so that a longitudinal line of the upper left corner coincides with the longitudinal line of the upper left corner of the title information storage frame 362, and a transverse line of the upper left corner is slightly lower than the transverse line of the title information storage frame. The image information storage frame overlaps the title information storage frame 362 and the character information storage frame 366.

The character information storage frame 366 is a rectangular frame having a width being about ½ of the transverse length of the layout region and a height substantially equal to the longitudinal length of the layout region, and an upper left corner thereof is located to coincide with the upper left corner of the title information storage frame 362. The character information storage frame overlaps the title information storage frame 362, the image information storage frame 364, and the image information storage frame 368.

The image information storage frame 368 is a rectangular frame having a width being about ½ of the transverse length of the layout region and a height being about ¼ of the longitudinal length of the layout region, and a lower left corner thereof is located to coincide with a lower left corner of the character information storage frame 366. The image information storage frame overlaps the character information storage frame 366.

The character information storage frame 370 is a rectangular frame having a width being about ½ of the transverse length of the layout region and a height substantially equal to the longitudinal length of the layout region, and an upper right corner thereof is located to coincide with an upper right corner of the title information storage frame 362. The character information storage frame overlaps title information storage frame 362 and the flow object storage frame 372.

The flow object storage frame 372 is a rectangular frame having a width being about ½ of the transverse length of the layout region and a height being about ¼ of the longitudinal length of the layout region, and a lower right corner thereof is located to coincide with a lower right corner of the character information storage frame 370. The flow object storage frame overlaps the character information storage frame 370.

Although the title information storage frame, the character information storage frames, and the image information storage frames are exemplified as the types of the information storage frames in the example of FIG. 3, an illustration information storage frame to store illustration information can be exemplified. The illustration information storage frame has a different usage from the image information storage frame in that the illustration information storage frame stores an illustration while the image information storage frame stores a picture.

The template registration DB 42 also registers a layout attribute table 400 to register weighting coefficients of the layout attributes.

FIG. 4 is a schematic showing the data structure of the layout attribute table 400.

As shown in FIG. 4, one record for each layout attribute is registered in the layout attribute table 400. Each of the records includes a field 402 to register a layout attribute and a field 404 to register a weighting coefficient.

In the example of FIG. 4, a first record registers "color scheme" as a layout attribute and "0.1" as a weighting coefficient. This means that, in case of calculating similarity of color scheme, the similarity is calculated with the weighting coefficient of 0.1.

Next, the data structure of the user information registration DB 10 will be described in detail with reference to FIG. 5.

The user information registration DB 10 registers a user information registration table 420 that registers the user information in correspondence with the user ID.

FIG. 5 is a schematic showing the data structure of the user information registration table 420.

As shown in FIG. 5, one record for each user is registered in the user information registration table 420. Each of the records includes a field 422 to register a user ID and a field 424 to register business-type information indicating a business type in which a user is engaged in.

In the example of FIG. 5, a first record registers "USER 1" as a user ID and "Architecture" as business-type information. This means that the user having the user ID "USER 1" is engaged in architecture.

Next, the data structure of the layout result data registration DB 12 will be described in detail with reference to FIG. 6.

The layout result data registration DB 12 registers plural items of comparison source layout result data 4 and a use history information registration table 440 to register file names of the comparison source layout result data 4 in correspondence with the user ID. Whenever comparison destination layout result data 2 is corrected, the corrected layout result data 6 is registered as the comparison source layout result data 4 in the layout result data registration DB 12.

Figures 6, 7:
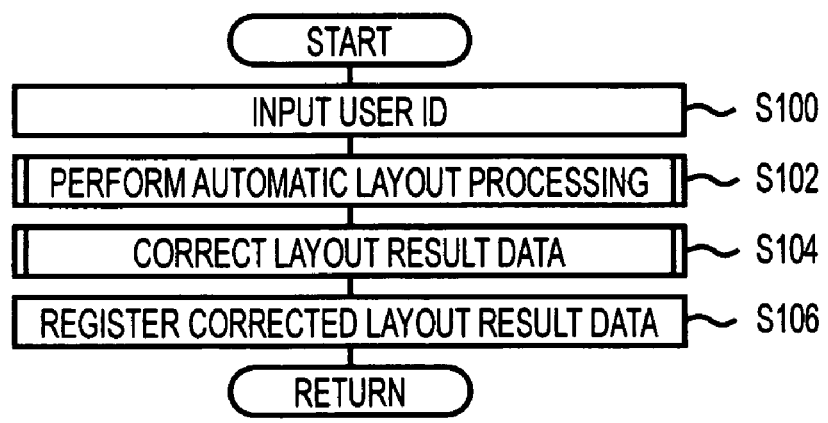
FIG. 6 is a schematic showing the data structure of a use history information registration table 440.
FIG. 7 is a flowchart showing layout processing.

FIG. 6 is a schematic showing the data structure of the use history information registration table 440.

As shown in FIG. 6, one record for each piece of comparison source layout result data 4 is registered in the use history information registration table 440. Each of the records includes a field 442 to register the file name of the comparison source layout result data 4, a field 444 to register a user ID of a user using the comparison source layout result data 4, and a field 446 to register a date of use of the comparison source layout result data 4.

In the example of FIG. 6, a first record registers "Layout 1" as a filename, "USER 2" as a user ID, and "Jun. 10, 2002" as a date of use. This means that a user having the user ID "USER 2" used the comparison source layout result data 4 indicated with the filename "Layout 1" on Jun. 10, 2002.

Next, the construction of the CPU 30 and processing executed by the CPU 30 will be described with reference to FIG. 7.

The CPU 30 is constructed with a micro-processing unit (MPU), etc., drives predetermined programs stored in predetermined region of the ROM 32, and executes layout processing shown in a flowchart of FIG. 7 according to the programs.

FIG. 7 is the flowchart showing the layout processing.

As shown in FIG. 7, when the CPU 30 is boosted, the layout processing first proceeds to Step S100.

In Step S100, the user ID of the user using the corrected layout result data 6 is input via input devices or communication devices. Then, the layout processing proceeds to Step S102.

In Step S102, layout elements are selected from the layout element registration DB 40 and automatic layout processing to automatically arrange the selected layout elements in the layout regions 360 is performed. Then, the layout processing proceeds to Step S104.

In Step S104, the layout result data of the automatic layout processing in Step S 102 is acquired as the comparison destination layout result data 2. Layout result data correction processing to correct the acquired comparison destination layout result data 2 is performed. Then, the layout proceeds to Step S106.

In Step S106, the corrected layout result data 6 of the layout result data correction processing in Step S104 is registered in the layout result data registration DB 12 in correspondence with the user ID. Specifically, the corrected layout result data 6 is registered as the comparison source layout result data 4 in the layout result data registration DB 12, and the filename thereof, the user ID input in Step S100, and the current data are registered in the use history information registration table 440.

Next, when the processing in Step S106 is completed, a series of processing is completed, and it returns to the initial processing.

Now, the automatic layout processing in Step S102 will be described in detail with reference to FIG. 8.

Figure 8:
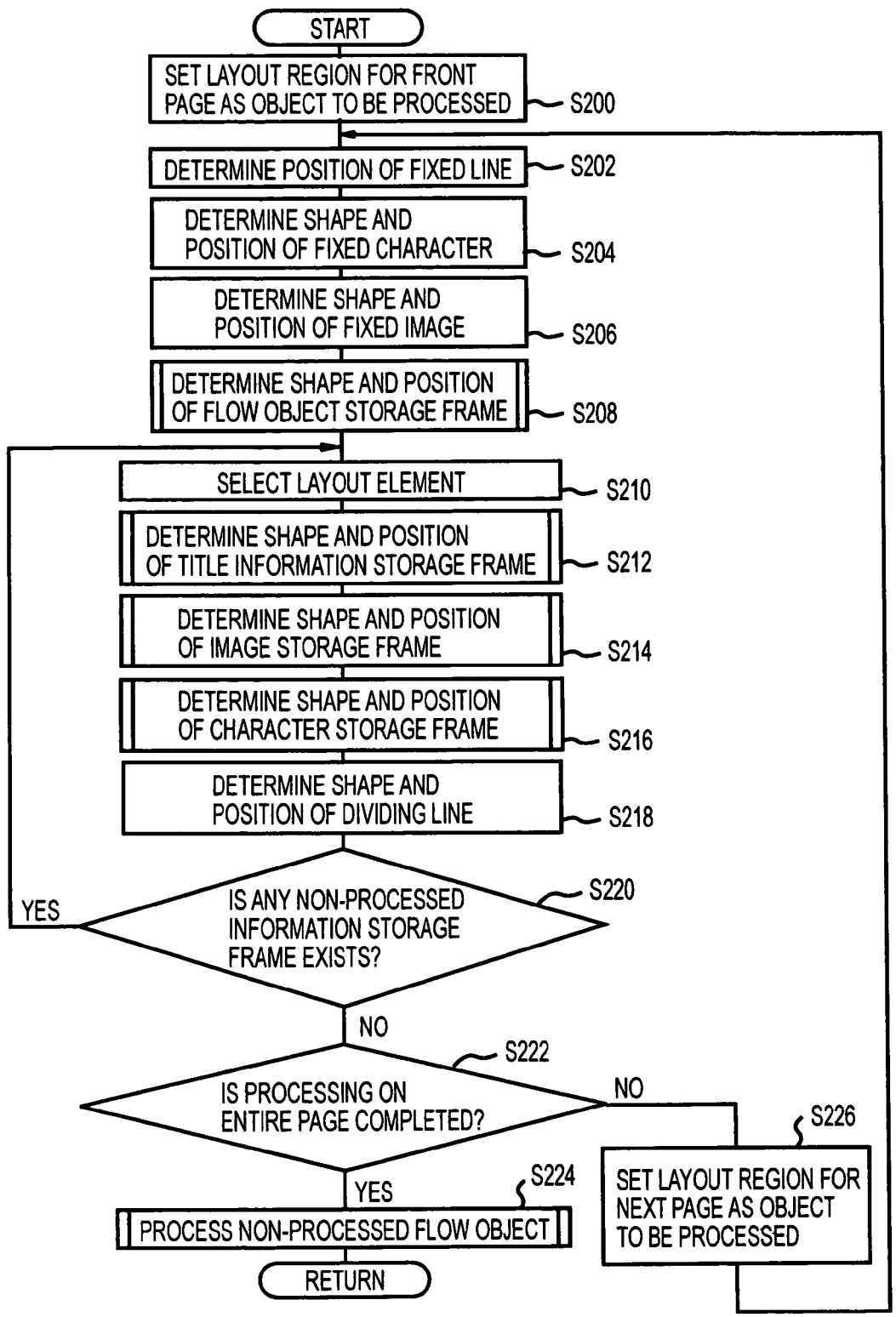
FIG. 8 is a flowchart showing automatic layout processing in Step S102.

FIG. 8 is a flowchart showing the automatic layout processing in Step S102.

As shown in FIG. 8, when Step S102 is executed, the automatic layout processing first proceeds to Step S200.

In Step S200, layout templates are read out from the template registration DB 42, and a layout region for a front page among the layout regions 360 of the read-out layout templates is set as an object to be processed. Then, the automatic layout processing proceeds to Step S202.

In Step S202, positions of fixed lines fixedly arranged in the page are determined. Then, Step S204 proceeds to determine a shape and position of fixed character information fixedly arranged in the page. Then, Step S206 proceeds to determine a shape and position of fixed image fixedly arranged in the page. Then, the automatic layout processing proceeds to Step S208.

In Step S208, it is determined whether or not a non-processed flow object exists. If it is determined that the non-processed flow object exists, processing to determine a shape and position of the flow object storage frame is performed based on the flow object storage frame. Then, the automatic layout processing proceeds to Step S210.

In Step S210, layout elements to be arranged in the layout regions 306 are selected from the layout element registration DB 40 based on a predetermined selection rule, and Step S212 proceeds.

In Step S212, it is determined whether or not the selected layout elements selected in Step S210 are title information. If it is determined that the selected layout elements are the title information, processing for determining a shape and position of a title information storage frame is performed based on the selected layout elements. The automatic layout processing proceeds to Step S216.

In Step S214, it is determined whether or not the selected layout elements are image information. If it is determined that the selected layout elements are image information, processing to determine a shape and position of an image information storage frame or an illustration information storage frame is performed based on the selected layout elements, the automatic layout processing proceeds to Step S216.

In Step S216, it is determined whether or not the selected layout elements are character information. If it is determined that the selected layout elements are character information, processing to determine a shape and position of a character information storage frame based on the selected layout elements is performed. Then, the automatic layout processing proceeds to Step S218.

In Step S218, processing to determine positions of dividing lines is performed. Step S220 proceeds to determine whether or not a non-processed information storage frame exists in the layout regions 360. If it is determined that the non-processed information storage frame does not exist (No), then the automatic layout control proceeds to Step S222.

In Step S222, it is determined whether or not the processing in Steps S202 to S220 for the entire page of the layout templates read out in Step S200 is completed. If it is determined that the processing for the entire page is completed (Yes), then the automatic layout control proceeds to Step S224.

In Step S224, it is determined whether or not a non-processed flow object exists. If it is determined that the non-processed flow object exists, the layout region 360 needed to publish the non-processed flow object are prepared as an additional page, and processing to publish the non-processed flow object in the layout region 360 is started. Then, a series of processing is completed, and it returns to the initial processing.

If Step S222 is determined that the processing in Steps S202 to S220 for the entire page of the layout templates read out in Step S200 is not completed (No), Step S226 proceeds to set a layout region for the next page, among the layout regions 360 of the layout templates read out in Step S200, as an object to be processed. Then, the automatic layout control proceeds to Step S202.

In Step S220, if it is determined that the non-processed information storage frame exists in the layout regions 360 (Yes), the automatic layout control proceeds to Step S210.

Next, the layout result data correction processing in Step S104 will be described in detail with reference to FIG. 9.

Figure 9:
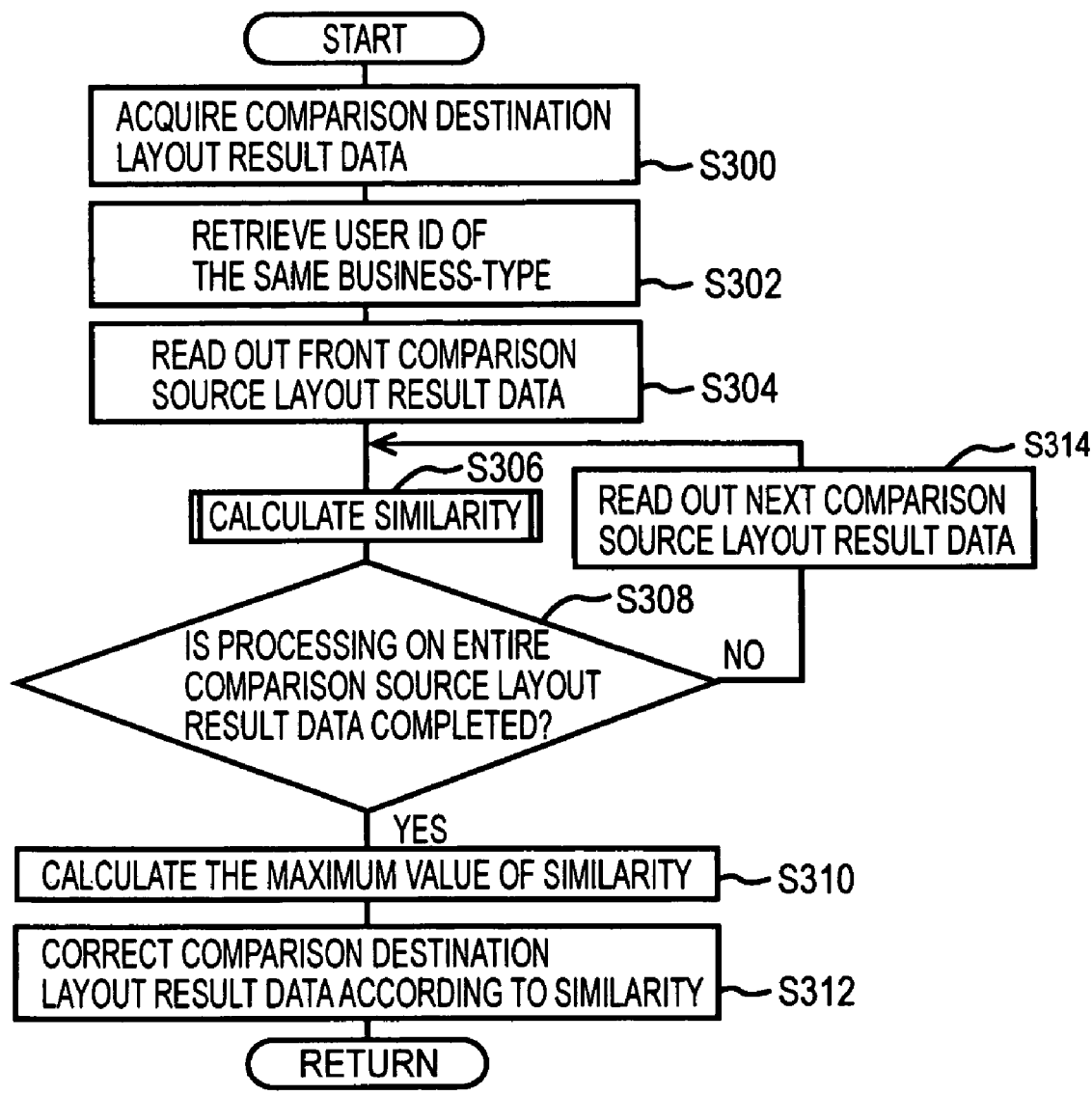
FIG. 9 is a flowchart showing layout result data correction processing in Step S104.

FIG. 9 is a flowchart showing the layout result data correction processing in Step S104.

As shown in FIG. 9, when Step S104 is executed, the layout result data correction processing first proceeds to Step S300.

In Step S300, the layout result data of the automatic layout processing in Step S102 is acquired as the comparison destination layout result data 2. Then the automatic layout processing proceeds to Step S302.

In Step S302, business-type information, identical to the business-type information corresponding to the user ID input in Step S100, is retrieved from the user information registration DB 10 to read out the user ID corresponding to the associated business-type information. When there are plural user IDs corresponding to the associated business-type information, all the user IDs are read out.

Next, in Step S304, the comparison source layout result data 4 corresponding to the read-out user ID is read out from the layout result data registration DB 12 with reference to the use history information registration table 440. When there are plural read-out user IDs, the comparison source layout result data 4 corresponding to a front one out of the user IDs is read out.

Next, Step S306 proceeds to calculate similarity between the acquired comparison destination layout result data 2 and the read-out comparison source layout result data 4. Next, Step S308 proceeds to determine whether or not the processing in Step S306 for the entire comparison source layout result data 4 corresponding to the read-out user ID is completed. If it is determined that the processing for the entire comparison source layout result data 4 is completed (Yes), then the automatic layout control proceeds to Step S310.

In Step S310, the similarity obtained by performing the processing in Step S306 only one time or a maximum value of the similarities obtained by performing the processing in Step S306 several times is calculated as a similarity which is finally obtained. Then the automatic layout control proceeds to Step S312.

In Step S312, the comparison destination layout result data 2 is corrected, so that the degree of correction of the comparison destination layout result data 2 increases as the calculated similarity increases. In this case, when the similarity is large, correction positions of the comparison destination layout result data 2 are allowed to increase and individuality of the comparison source layout result data 4 is allowed to increase. However, when the similarity is small, since it is considered that the individuality of the comparison source layout result data 4 has already increased, the correction positions of the comparison destination layout result data 2 are allowed to reduce.

The correction of the comparison destination layout result data 2 may be performed by preparing a plurality of correction rules and applying the correction rules, of which number corresponds to the similarity, to the comparison destination layout result data 2. As a result, when the similarity is large, since a large number of correction rules are applied, the correction positions of the comparison destination layout result data 2 increase. However, when the similarity is small, since a small number of correction rules are applied, the correction positions of the comparison destination layout result data 2 reduce.

The degree of the similarity can be determined by using a predetermined threshold value. For example, when the acquired similarity has a value in a range of 0 to 1, the comparison destination layout result data 2 may be corrected according to the following steps (a) to (e).

(a) When the similarity is equal to or larger than 0.8, the correction positions of the comparison destination layout result data 2 is set to 10.

(b) When the similarity is equal to or larger than 0.5 and smaller than 0.8, the correction positions of the comparison destination layout result data 2 is set to 7.

(c) When the similarity is equal to or larger than 0.3 and smaller than 0.5, the correction positions of the comparison destination layout result data 2 is set to 5.

(d) When the similarity is equal to or larger than 0.1 and smaller than 0.3, the correction positions of the comparison destination layout result data 2 is set to 3.

(e) When the similarity is smaller than 0.1, the correction positions of the comparison destination layout result data 2 is set to 0.

Next, when the processing in Step S321 is completed, a series of processing is completed, it returns to the initial processing.

In Step S308, if it is determined that the processing in Step S306 for the entire comparison source layout result data 4 corresponding to the read-out user ID is not completed (No), Step S314 proceeds to read out the comparison source layout result data 4 corresponding to the next one of the read-out user IDs from the layout result data registration DB 12, and the automatic layout control proceeds to Step S306.

Next, the similarity calculation processing in Step S306 will be described in detail with reference to FIG. 10.

Figure 10:
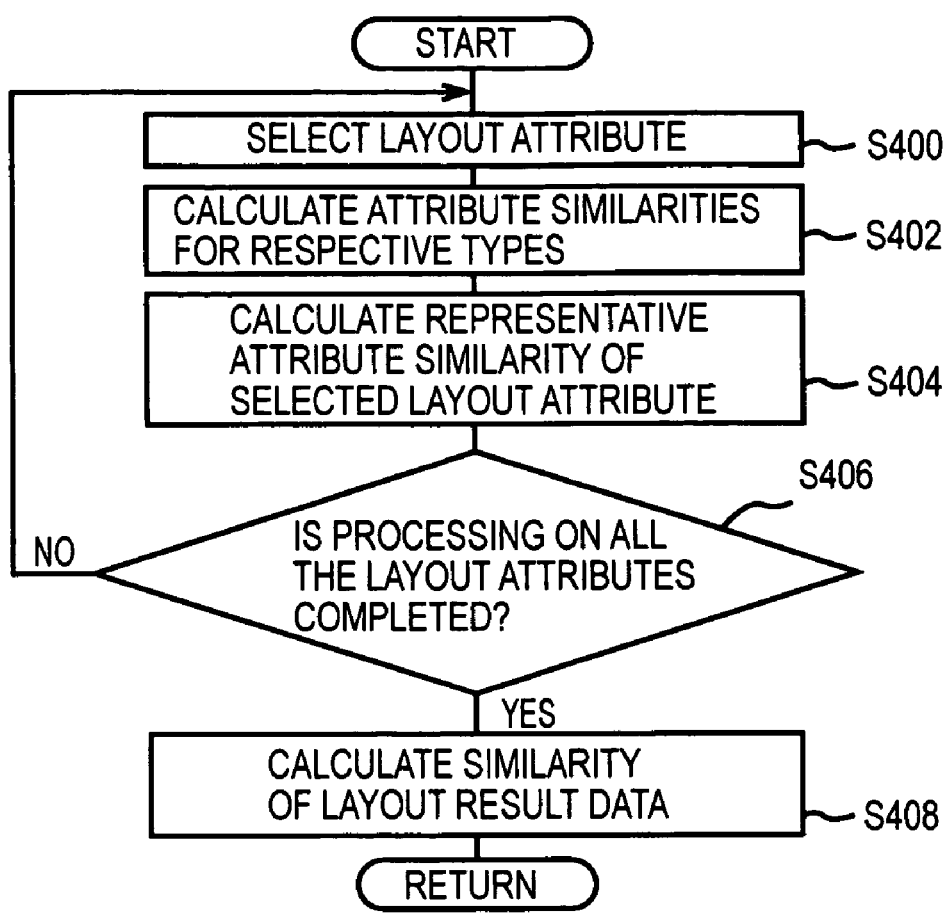
FIG. 10 is a flowchart showing similarity calculation processing in Step S306.

FIG. 10 is a flowchart showing the similarity calculation processing in Step S306.

As shown in FIG. 10, when Step S306 is executed, the similarity calculation processing first proceeds to Step S400.

In Step S400, a layout attribute (hereinafter, a selected layout attribute) is selected from the layout attribute table 400, and Step S402 proceeds.

In Step S402, an attribute similarity between the selected layout attribute of the information storage frame of the comparison destination layout result data 2 and the selected layout attribute of the information storage frame of the comparison source layout result data 4 is calculated for each type of the information storage frame.

(1) For example, in a case where the selected layout attribute is a font size, the attribute similarity Sim for the title information storage frame is calculated by using the following Equation (1) based on the font size of the title information storage frame of the comparison destination layout result data 2 and the font size of the title information storage frame of the comparison source layout result data 4.

Equation 1

$$Sim = \text{Max}_i \left\{ \frac{\text{Max}_j(X_{(i)} - f(X_{(i)}, Y_{(j)}))}{X_{(i)}} \right\} \quad (1)$$

Here, in Equation (1), X(i) denotes a font size of the title information storage frame of the comparison destination layout result data 2, and i denotes the number of the title information storage frames belonging to the comparison destination layout result data 2. In addition, Y(j) denotes a font size of the title information storage frame of the comparison source layout result data 4, and j denotes the number of the title information storage frames of the comparison source layout result data 4. In addition, if X≧Y, f(X,Y)=X−Y, if Y≧X and X≧Y−X, f(X,Y)=Y−X, and if not, f(X,Y)=X. In addition, Max(n) is a function of selecting a maximum value of n element values.

Similarly, an attribute similarity for the character information storage frame can be also calculated by using Equation (1). Since a font size for the image information storage frame and the illustration information storage frame is not defined, an attribute similarity for these information storage frames is not calculated.

In a case, for example, where the selected layout attribute is a font weight of the title information storage frame, the attribute similarity Sim for the title information storage frame is calculated by using Equation (1) based on the font weight of the title information storage frame of the comparison destination layout result data 2 and the font weight of the title information storage frame of the comparison source layout result data 4.

Here, in Equation (1), X(i) denotes a font size of the title information storage frame of the comparison destination layout result data 2, and i denotes the number of the title information storage frames belonging to the comparison destination layout result data 2. In addition, Y(j) denotes a font weight of the title information storage frame of the comparison source layout result data 4, and j denotes the number of the title information storage frames of the comparison source layout result data 4.

Similarly, an attribute similarity for the character information storage frame can be also calculated by using Equation (1). Since a font weight for the image information storage frame and the illustration information storage frame is not defined, an attribute similarity for these information storage frames is not calculated.

(3) In a case, for example, where the selected layout attribute is an arrangement position, the attribute similarity for the title information storage frame can be calculated by using a technique of Japanese Unexamined Patent Application Publication No. 2001-228596, for example, based on an arrangement position of the title information storage frame of the comparison destination layout result data 2 and an arrangement position of the title information storage frame of the comparison source layout result data 4. Specifically, the number of information storage frames in a structural model of the comparison destination layout result data 2 having types matching with those of the information storage frames in a structural model of the comparison source layout result data 4 at the same positions is calculated, the calculated number is divided by a total number of the information storage frames, and the resulting value is calculated as an attribute similarity.

Similarly, attribute similarities for the character information storage frame, the image information storage frame, and the illustration information storage frame can be also calculated.

(4) In a case, for example, where the selected layout attribute is the size of an information storage frame, the attribute similarity Sim for the title information storage frame is calculated by using Equation (1) based on the size of the title information storage frame of the comparison destination layout result data 2 and the size of the title information storage frame of the comparison source layout result data 4.

Here, in Equation (1), X(i) denotes the area of the title information storage frame of the comparison destination layout result data 2, and i denotes the number of the title information storage frames belonging to the comparison destination layout result data 2. Y(j) denotes the area of the title information storage frame of the comparison source layout result data 4, and j denotes the number of the title information storage frames of the comparison source layout result data 4.

Similarly, attribute similarities for the character information storage frame, the image information storage frame, and the illustration information storage frame can be also calculated by using Equation (1).

Next, Step S404 proceeds to calculate an average value of the attribute similarities calculated for respective types as a representative attribute similarity, and proceeds to Step S406.

In Step S406, it is determined whether or not the processing in Steps S400 to S404, for the entire layout attributes of the layout attribute table 400, is completed. If it is determined that the processing for the entire layout attributes is completed (Yes), the similarity calculation processing proceeds to Step S408.

In Step S408, weighting coefficients for the respective layout attributes are read out from the layout attribute table 400, the representative attribute similarities calculated in Step S404 are multiplied by the weighting coefficients, and an average value of the multiplication results is calculated as similarity for the layout result data. Then, a series of processing is completed, and it returns to the initial processing.

On the other hand, in Step S406, if it is determined that the processing in Steps S400 to S404 for the entire layout attributes of the layout attribute table 400 is not completed (No), the similarity calculation processing proceeds to Step S400.

Now, the operation of the exemplary embodiment will be described.

In a case where the layout result data of the automatic layout processing is provided to the user, the user ID of the user to whom the layout result data is provided is input in the layout apparatus 100. In this case, individuality of the provided layout result data may be higher than that of the layout result data that was previously provided to other users engaged in the same business type.

When the user ID is input in the layout apparatus 100, the automatic layout processing is performed according to Step S102. The automatic layout processing will be described exemplifying a case where layout is performed by using the layout template of FIG. 3.

First, according to Steps S200 to S210, a position of a fixed line, a shape and position of fixed character information, and a shape of position of fixed image information are determined in this order. A layout element is selected from the layout element registration DB 40 based on a predetermined selection rule.

Next, in a case where the selected layout element is title information, since the title information storage frame 362 exists in the layout region 360, processing for determining a shape and position of the title information storage frame 362 is performed based on the selected layout element according to Step S212. In this determination process, an information amount of the title information is calculated, the shape and position of the title information storage frame 362 are determined based on the calculated information amount, and the title information is stored in the title information storage frame 362. For example, in a case where the title is relatively short, a default title information storage frame 362 is deformed upwards, so that the title information can be accurately accommodated.

In a case where the selected layout element is image information, since the image information storage frame 364 exists in the layout region 360, processing to determine a shape and position of the image information storage frame 364 is performed based on the selected layout element according to Step S214. In this determination process, an information amount of the image information is calculated, the shape and position of the image information storage frame 364 is determined so as not to overlap other information storage frames, and the image information is stored in the image information storage frame 364. For example, in a case where a height of an image is larger than a width thereof and there is a command of rightward deflection, a default image information storage frame 364 is deformed downwards (or upwards if possible) up to a minimum position where the default image information storage frame does not overlap the title information storage frame 362, the position after the deformation is set as an upper limit of an upward shift. Then, the image information storage frame 364 is deformed rightwards with the aspect ratio of the image being maintained. As a result, it is possible to load the image in an available maximum size with the aspect ratio of the image being maintained.

In a case where the selected layout element is character information, since the character information storage frame 366 exists in the layout region 360, processing of determining a shape and position of the character information storage frame 366 is performed based on the selected layout element according to Step S216. In this determination process, an information amount of the character information is calculated so that the character information storage frame cannot overlap other information storage frames. The shape and position of the character information storage frame 366 are determined based on the calculated information amount. The character information is stored in the character information storage frame 366. For example, in a case where an upper left portion of the character information storage frame 366 overlaps the image information storage frame 364, the character information storage frame 366 is partitioned into two upper and lower frames: the overlapping portion of the character information storage frame overlapping the image information storage frame 364; and the non-overlapping portion thereof. The upper frame out of the partitioned character information storage frames 366, of which a position is set as upper limits of downward and leftward shifts, is deformed leftwards up to a minimum position where the character information storage frame does not overlap the image information storage frame 364, and is deformed downwards (or upward if possible) up to a minimum position where the character information storage frame does not overlap the title information storage frame 362. In addition, the lower frame out of the partitioned character information storage frames 366, of which a position is set as an upper limit of an upward shift, is deformed upwards up to a minimum position where the character information storage frame does not overlap the image information storage frame 368. Next, the character information is first stored in the upper frame out of the partitioned character information storage frames 366, and a non-stored portion of the character information is stored in the lower frame out of the partitioned character information storage frames 366. As a result, since the character information storage frame 366 even overlapping other information storage frames is partitioned, it is possible to efficiently store the character information and to maintain continuity of contents between partitioned frames.

Figure 11:
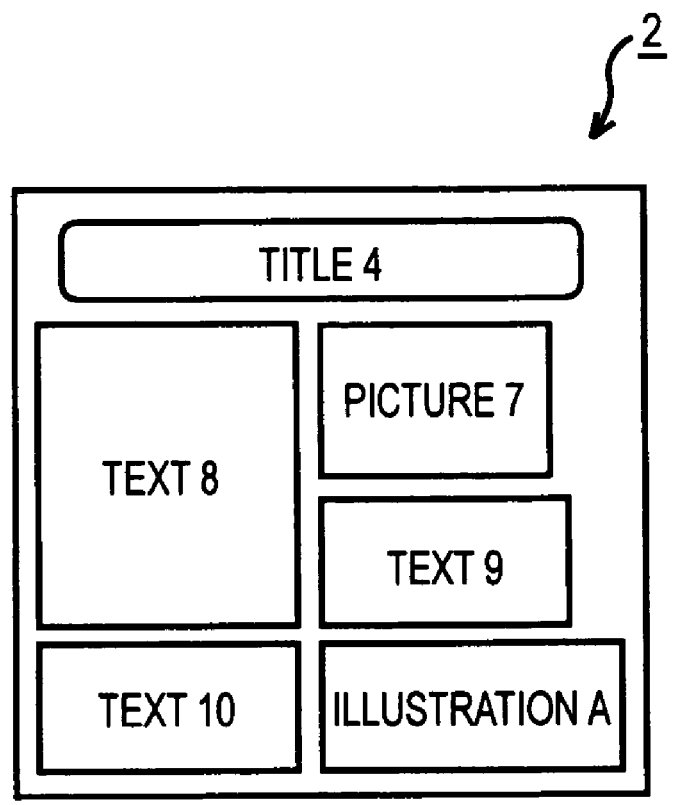
FIG. 11 is a schematic showing comparison destination layout result data 2.

FIG. 11 is a schematic showing the comparison destination layout result data 2.

When the automatic layout processing is completed, the layout result data of the automatic layout processing is acquired as the comparison destination layout result data 2 according to Step S300. In this case, it is assumed that the comparison destination layout result data 2 shown in FIG. 11 is acquired.

Next, the business-type information, identical to the business-type information corresponding to the input user ID, is retrieved from the user information registration DB 10 to read out all user IDs corresponding to the associated business-type information according to Step S302. In this case, it is assumed that the number of user IDs corresponding to the associated business-type information is 3.

FIG. 12 is a schematic showing the comparison source layout result data 4.

Figure 12A:
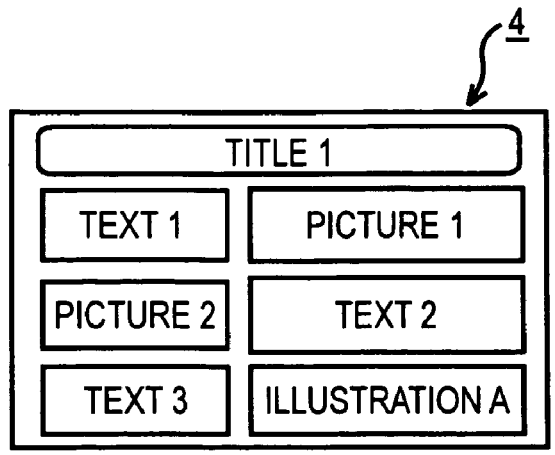
FIG. 12 is a schematic showing comparison source layout result data 4.

Next, the comparison source layout result data 4 corresponding to the first one out of the read-out user IDs is read out from the layout result data registration DB 12 according to Step S304. In this case, if it is assumed that the comparison source layout result data 4 shown in FIG. 12A is read out, similarity between the comparison destination layout result data 2 of FIG. 11 and the comparison source layout result data 4 of FIG. 12A is calculated according to Step S306.

Figure 12B:
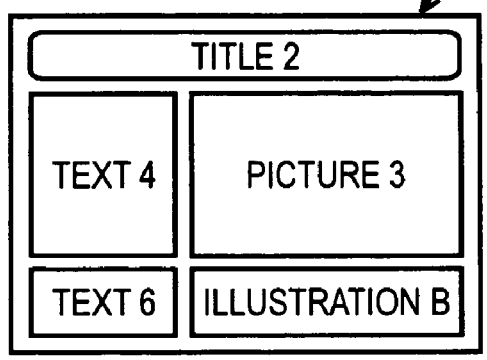

Similarly, the comparison source layout result data 4 corresponding to the second one out of the read-out user IDs is read out from the layout result data registration DB 12 according to Step S314. In this case, if it is assumed that the comparison source layout result data 4 shown in FIG. 12B is read out, similarity between the comparison destination layout result data 2 of FIG. 11 and the comparison source layout result data 4 of FIG. 12B is calculated according to Step S306.

Figure 12C:
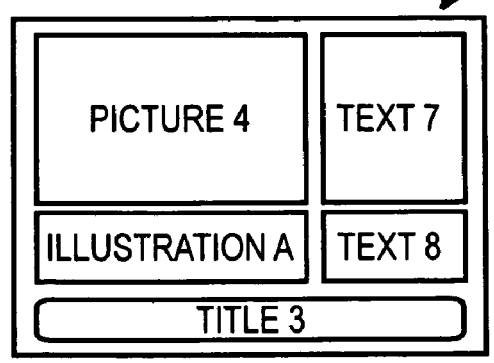

Similarly, the comparison source layout result data 4 corresponding to the third one out of the read-out user IDs is read out from the layout result data registration DB 12 according to Step S314. In this case, if it is assumed that the comparison source layout result data 4 shown in FIG. 12C is read out, similarity between the comparison destination layout result data 2 of FIG. 11 and the comparison source layout result data 4 of FIG. 12C is calculated according to Step S306.

Figure 13:
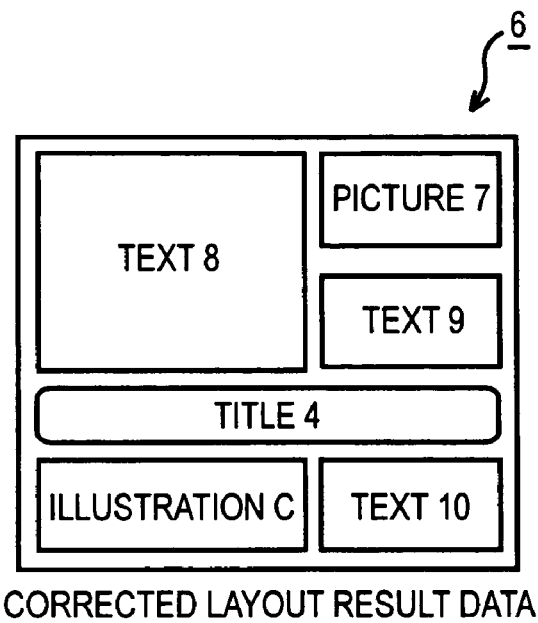
FIG. 13 is a schematic showing corrected layout result data 6.

FIG. 13 is a schematic showing the corrected layout result data 6.

In this way, if the similarities for entire comparison source layout result data 4 are calculated, according to Steps S310 and S312, a maximum value of the similarities is calculated as a final similarity, and the comparison destination layout result data 2 is corrected so that the degree of correction of the comparison destination layout result data 2 increases as the calculated similarity increases. As a result, if the corrected layout result data 6 shown in FIG. 13 is acquired, the corrected layout result data 6 of FIG. 13 is provided to the user. In addition, the corrected layout result data 6 is registered in the layout result data registration DB 12 in correspondence with the user ID according to Step S106.

Next, operations to calculate the similarity between the comparison destination layout result data 2 and the comparison source layout result data 4 will be described in detail.

Figure 14A:
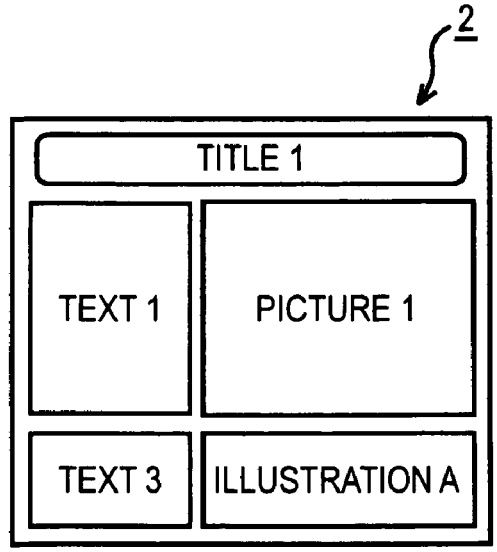
FIG. 14 is a schematic showing the comparison destination layout result data 2 and the comparison source layout result data 4.

FIGS. 14A and B are schematics showing the comparison destination layout result data 2 and the comparison source layout result data 4.

When the automatic layout processing is completed, the layout result data of the automatic layout processing is acquired as the comparison destination layout result data 2. In this case, it is assumed that the comparison destination layout result data 2 shown in FIG. 14A is acquired.

In the example of FIG. 14A, a title information storage frame to store Title 1, a character information storage frame to store Text 1, a character information storage frame to store Text 3, an image information storage frame to store Picture 1, and an illustration information storage frame to store Illustration A are arranged in the comparison destination layout result data 2.

Next, the business-type information identical to the business-type information corresponding to the input user ID is retrieved from the user information registration DB 10 to read out the user ID corresponding to the associated business-type information.

Next, the comparison source layout result data 4 corresponding to the read-out user ID is read out from the layout result data registration DB 12. In this case, it is assumed that the comparison source layout result data 4 shown in FIG. 14B is read out.

Figure 14B:
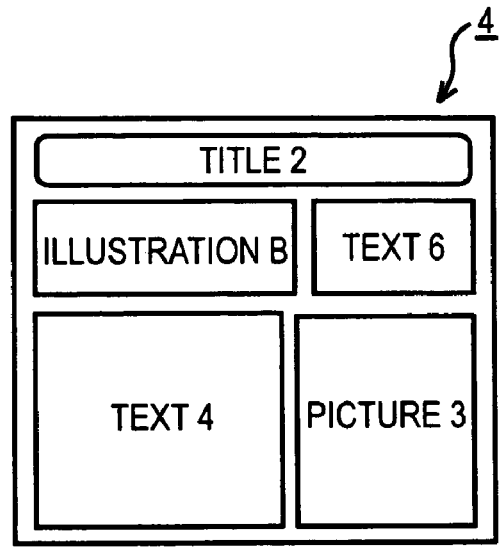

In the example of FIG. 14B, a title information storage frame to store Title 2, an illustration information storage frame to store Illustration B, a character information storage frame to store Text 4, a character information storage frame to store Text 6, and an image information storage frame to store Picture 3 are arranged in the comparison source layout result data 4.

Next, similarity between the comparison destination layout result data 2 of FIG. 14A and the comparison source layout result data 4 of FIG. 14B is calculated. In the below description, it is assumed that the number of types of information storage frames is 4 types including a title information storage frame, a character information storage frame, an image information storage frame and an illustration information storage frame, and the number of types of layout attributes is 4 types including a font size, a font weight, an arrangement position of an information storage frame, and the size of an information storage frame.

First, according to Steps S400 and S402, the font size is selected as a layout attribute, and attribute similarities for respective types of the information storage frames are calculated.

Figures 15, 16:
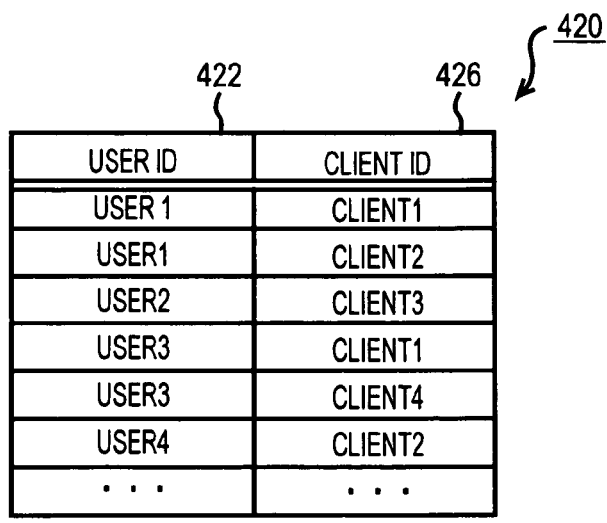
FIG. 15 shows results of analysis of font sizes and font weights of a title information storage frame and a character information storage frame for the comparison destination layout result data 2 and the comparison source layout result data 4.
FIG. 16 is a schematic showing the data structure of a user information registration table 420.

FIG. 15 shows results of analysis of font sizes and font weights of the title information storage frame and the character information storage frame for the comparison destination layout result data 2 and the comparison source layout result data 4.

As shown in FIG. 15, the attribute similarity Sim for the title information storage frame is calculated as $(20-10)/20=0.5$ by using Equation (1) based on the font size ($=20$) of Title 1 of the comparison destination layout result data 2 and the font size (=30) of Title 2 of the comparison source layout result data 4.

As shown in FIG. 15, the attribute similarity Sim for the character information storage frame is calculated as 1.0 by using Equation (1) based on the font size (=12) of Text 1 and the font size (=12) of Text 3 of the comparison destination layout result data 2, and the font size (=10) of Text 4 and the font size (=10) of Text 6 of the comparison source layout result data 4.

Next, an average value of the calculated similarities for the respective types is calculated as a representative attribute similarity according to Step S404. Since the attribute similarity for the title information storage frame is 0.5 and the attribute similarity for the character information storage frame is 1.0, the representative attribute similarity for the font size is 0.75.

Next, according to Steps S400 and S402, the font weight is selected as a layout attribute, and attribute similarities for respective types of the information storage frames are calculated.

As shown in FIG. 15, the attribute similarity Sim for the title information storage frame is calculated as (10−5)/10=0.5 by using Equation (1) based on the font weight (=10) of Title 1 of the comparison destination layout result data 2 and the font weight (=15) of Title 2 of the comparison source layout result data 4.

As shown in FIG. 15, the attribute similarity Sim for the character information storage frame is calculated as 1.0 by using Equation (1) based on the font weight (=5) of Text 1 and font weight (=5) of Text 3 of the comparison destination layout result data 2 and the font weight (=3) of Text 4 and the font weight (=3) of Text 6 of the comparison source layout result data 4.

Next, an average value of the calculated similarities for the respective types is calculated as a representative attribute similarity according to Step S404. Since the attribute similarity for the title information storage frame is 0.5 and the attribute similarity for the character information storage frame is 1.0, the representative attribute similarity for the font weight is 0.75.

Next, according to Step S400, the arrangement position of the information storage frame is selected as a layout attribute. Next, according to Steps S402 and S404, the number of information storage frames in a structural model of the comparison source layout result data 2 having types matching with those of the information storage frames in a structural model of the comparison source layout result data 4 at the same positions is calculated by using the technique of Japanese Unexamined Patent Application Publication No. 2001-228596 the calculated number is divided by a total number of the information storage frames, and the result of the dividing operation is calculated as an attribute similarity. In the structural model, since Titles 1 and 2 are identical to each other and Texts 3 and 4 are identical to each other, the matching number is 2. In addition, since the total number of the information storage frames is 5, the representative attribute similarity for the arrangement position is 2/5=0.4.

Next, according to Steps S400 and S402, the size of the information storage frame is selected as a layout attribute, and attribute similarities for respective types of the information storage frames are calculated. Here, it is assumed that the attribute similarities Sim for the title information storage frame, the character information storage frame, the image information storage frame, and the illustration information storage frame are calculated as 1.0, 0.8, 0.8, and 0.8, respectively.

Next, an average value of the calculated similarities for the respective types is calculated as a representative attribute similarity according to Step S404. Since the attribute similarity for the title information storage frame is 1.0 and the attribute similarities for the character information storage frame, the image information storage frame and the illustration information storage frame are 0.8, the representative attribute similarity for the size is 0.85.

In this way, when the representative attribute similarities for all layout attributes are calculated, according to Step S408, the weighting coefficients for the respective layout attributes are read out from the layout attribute table 400, the calculated representative attribute similarities are multiplied by the weighting coefficients, and an average value of the multiplication results is calculated as similarity for the layout result data. Since the representative attribute similarities for the font size, the font weight, the arrangement position, and the size are 0.75, 0.75, 0.4, and 0.85, respectively, and the weighting coefficients thereof are 0.8, 0.3, 0.3, and 0.7, the similarity for the layout result data is (0.75×0.8+0.75×0.3+0.4×0.3+0.85×0.7)/4=0.385.

When the similarities of the layout result data are calculated, a maximum value of these similarities is calculated as a final similarity, and the comparison destination layout result data 2 is corrected so that the degree of correction of the comparison destination layout result data 2 increases as the calculated similarity increases. The corrected layout result data 6 is provided to the user.

In this way, in the exemplary embodiment, the layout result data of the automatic layout processing is acquired as the comparison destination layout result data 2, the comparison source layout result data 4 is read out from the layout result data registration DB 12, the similarity between the comparison destination layout result data 2 and the comparison source layout result data 4 is calculated, and the comparison destination layout result data 2 is corrected so that the degree of correction of the comparison destination layout result data 2 increases as the calculated similarity increases.

As a result, in a case where the layout result data is provided to other users engaged in the same business type, since the layout result data provided to one user is corrected so that the degree of correction increases as the similarity for the layout result data provided to another user increases, it is possible to implement layout with a high individuality in comparison with the related art.

In the exemplary embodiment, the corrected layout result data 6 is registered in the layout result data registration DB 12 as the comparison source layout result data 4 in correspondence with the input user ID. The business-type information identical to the business-type information corresponding to the input user ID is retrieved from the user information registration DB 10 to read out the user ID corresponding to the associated business-type information. The comparison source layout result data 4 corresponding to the read-out user ID is read out from the layout result data registration DB 12.

As a result, since the past layout result data can be used as the comparison source layout result data 4, it is possible to implement layout with a high individuality in comparison with the layout result data which are previously used by other users engaged in the same business type.

In the exemplary embodiment, the similarity for the layout result data is calculated based on the layout attributes of the comparison destination layout result data 2 and the layout attributes of the comparison source layout result data 4.

As a result, since the similarity is calculated based on the layout attributes of the information storage frames, the similarity for the layout result data can be calculated in consideration of similarities for the respective information storage frames. Therefore, it is possible to calculate the similarity with suitably reflecting reader's preference in comparison with the related art.

In the first exemplary embodiment, the user information registration DB 10 corresponds to the user-information storage device of the fourth, tenth, and sixteenth aspects; the layout result data registration DB 12 corresponds to the layout-result-data storage device of the third, fourth, ninth, tenth, fifteenth, and sixteenth aspects; and the layout element registration DB 40 corresponds to the layout-element storage means of the second, eighth, fourteenth, and twentieth aspects. The comparison destination layout result data 2 corresponds to the correction-object layout result data of the first to third, seventh to ninth, thirteenth to fifteenth, and nineteenth to twenty-first aspects; and the comparison source layout result data 4 corresponds to comparison-object layout result data of the first to fourth, seventh to tenth, thirteenth to sixteenth, and nineteenth to twenty-first aspects.

In the first exemplary embodiment, the user ID corresponds to the user identification information of fourth, tenth, or sixteenth aspect; Step S100 corresponds to the user-identification-information input device of the fourth aspect; Step S106 corresponds to the layout-result-data registration device of third or fourth aspect; and Step S210 corresponds to the layout-element selection device of the second and twentieth aspects or the layout-element selecting step of the eighth, fourteenth, and twentieth aspects. In addition, Steps S208, S212 to S216, and S224 correspond to the layout device of second, third or twentieth aspect or the layout step of the eighth, ninth, fourteenth, fifteenth, and twentieth aspects; and the comparison destination input unit 14 and Step S300 correspond to the correction-object input device of first, second, seventh, twentieth, or twenty-first aspect.

In the first exemplary embodiment, Step S300 corresponds to the correction-object input device of eighth, thirteenth, fourteenth, or nineteenth to the twenty-first aspect; to the comparison source input unit 16 and Steps S302, S304, and S314 correspond to the comparison-object input device of first to fourth, seventh, twentieth, or twenty-first aspect; and Steps S302, S304, S314 correspond to the comparison-object inputting step of the eighth to tenth, thirteenth to sixteenth, or nineteenth to twenty-first aspects. The similarity calculation unit 18 and Steps S400 to S408, and S310 correspond to the layout-result-data comparison device of the first aspect or the similarity calculation device of the second, seventh, twentieth, or twenty-first aspect; and Steps S400 to S408, and S310 correspond to the similarity calculating step of the eighth, thirteenth, fourteenth, or nineteenth to twenty-first aspect.

In the first exemplary embodiment, the layout correction unit 20 and Step S312 correspond to the layout correction device of the first to third, seventh, twentieth, and twenty-first aspects; and Step S312 corresponds to layout-correcting step of the eighth, ninth, thirteenth to fifteenth, and nineteenth to twenty-first aspects.

Figure 17:
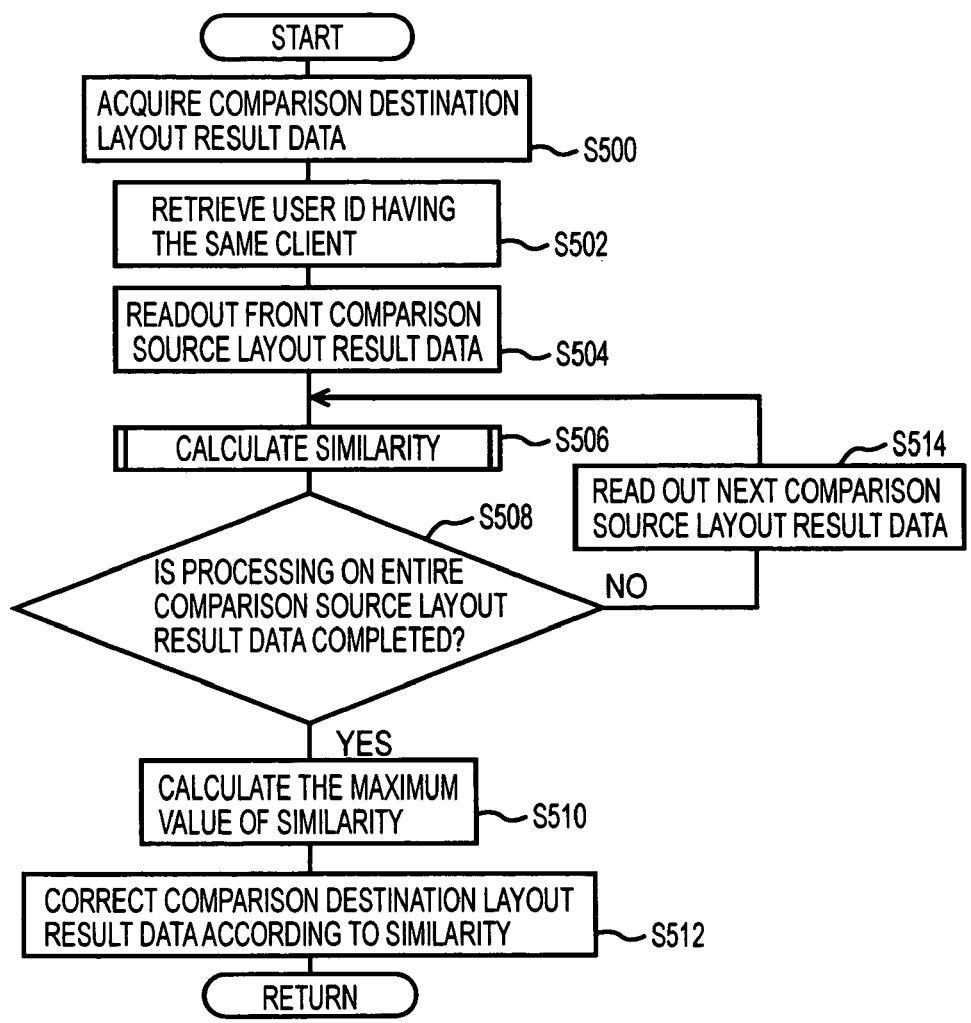
FIG. 17 is a flowchart showing layout result data correction processing.

Now, a second exemplary embodiment of the present invention will be described with reference to the drawings. FIGS. 16 and 17 are schematics showing the second exemplary embodiment of a layout system, a layout program, and a layout method of the present invention.

In the exemplary embodiment, the layout system, the layout program and the layout method is adapted to a case where layout result data of automatic layout processing is corrected. The difference between the second exemplary embodiment and the first exemplary embodiment is that the layout result data of the automatic layout processing is corrected in a case where another user managing the same client provides the layout result data to the client. Hereinafter, the difference from the first exemplary embodiment is described, the same portions as those of the first exemplary embodiment are indicated with the same reference numerals, and the description thereof is omitted.

First, the data structure of a user information registration table 420 will be described in detail with reference to FIG. 16.

FIG. 16 is a schematic showing the data structure of the user information registration table 420.

As shown in FIG. 16, one record for each user is registered in the user information registration table 420. Each of the records includes a field 422 to register a user ID and a field 426 to register a client ID identifying the client managed by the user. A plurality of client IDs may be registered in the field 426.

In the example of FIG. 16, a first record registers "USER 1" as a user ID and "Client 1" as a client ID. This means that the user having the user ID "USER 1" manages the client having the client ID "Client 1".

Next, the construction of the CPU 30 and processing executed by the CPU 30 will be described with reference to FIG. 17.

The CPU 30 executes the layout result data correction processing shown in a flowchart of FIG. 17 instead of the layout result data correction processing shown the flowchart of FIG. 9.

FIG. 17 is the flowchart showing the layout result data correction processing.

As shown in FIG. 17, when Step S104 is executed, the layout result data correction processing first proceeds to Step S500.

In Step S500, processing corresponding to Step S300 of the flowchart of FIG. 9 is performed and then proceeds to Step S502.

In Step S502, a client ID identical to the client ID corresponding to the user ID input in Step S100 is retrieved from the user information registration DB 10 and then proceeds to Step S504. When there are plural user IDs corresponding to the associated client ID, all the user IDs are read out.

In Steps S504 to S514, processing corresponding to the processing in Steps S304 to S314 of the flowchart of FIG. 9 is performed. Then, a series of processing is completed, it returns to the initial processing.

Now, the operation of the exemplary embodiment will be described.

In a case where the layout result data of the automatic layout processing is provided to the client, the user ID of the user is input in the layout apparatus 100. In this case, individuality of the provided layout result data may be higher than that of the layout result data that was previously provided to the client by another user managing the same client.

When the user ID is input in the layout apparatus 100, according to Steps S102 and S500, the automatic layout processing is performed. The layout result data of the automatic layout processing is acquired as the comparison destination layout result data 2.

Next, according to Step S502, the client IDs identical to the client ID corresponding to the input user ID are retrieved from the user information registration DB 10 to read out all the user IDs corresponding to the associated client ID.

Next, according to Steps S504 and S506, the comparison source layout result data 4 corresponding to the front one out of the read-out user IDs is read out from the layout result data registration DB 12, and similarity between the acquired comparison destination layout result data 2 and the read-out comparison source layout result data 4 is calculated. Similarly, in a case where there are plural user IDs, according to repetition in Steps S514 and S506, the comparison source layout result data 4 corresponding to the next one out of the read-out user IDs is read out from the layout result data registration DB 12, and similarity between the acquired comparison destination layout result data 2 and the read-out comparison source layout result data 4 is calculated.

In this way, when the similarities of the entire comparison source layout result data 4 are calculated, according to Steps S510 and S512, a maximum value of these similarities is calculated as a final similarity, and the comparison destination layout result data 2 is corrected so that the degree of correction of the comparison destination layout result data 2 increases as the calculated similarity increases.

In this way, in the exemplary embodiment, the layout result data of the automatic layout processing is acquired as the comparison destination layout result data 2, the comparison source layout result data 4 is read out from the layout result data registration DB 12, the similarity between the comparison destination layout result data 2 and the comparison source layout result data 4 is calculated. The comparison destination layout result data 2 is corrected so that the degree of correction of the comparison destination layout result data 2 increases as the calculated similarity increases.

As a result, in a case where another user managing the same client provides the layout result data to the client, since the degree of correction increases as the similarity between the layout result data provided by the one user and the layout result data by the other user increases, it is possible to implement layout with a high individuality in comparison with the related art.

In the exemplary embodiment, the corrected layout result data 6 is registered in the layout result data registration DB 12 as the comparison source layout result data 4 in correspondence with the input user ID, the client ID identical to the client ID corresponding to the input user ID is retrieved from the user information registration DB 10 to read out the user ID corresponding to the associated client ID. The comparison source layout result data 4 corresponding to the read-out user ID is read out from the layout result data registration DB 12.

As a result, since the past layout result data can be used as the comparison source layout result data 4, it is possible to implement layout with high individuality in comparison with the layout result data which are previously used for the client by another user managing the same client.

In the second exemplary embodiment, the user information registration DB 10 corresponds to the user-information storage device of the fourth, tenth, or sixteenth aspect; the layout result data registration DB 12 corresponds to the layout-result-data storage device of the third, fourth, ninth, tenth, fifteenth, or sixteenth aspect; and the layout element registration DB 40 corresponds to the layout-element storage device of the second, eight, fourteenth, or twentieth aspect. The comparison destination layout result data 2 corresponds to correction-object layout result data of the first to third, seventh to ninth, thirteenth to fifteenth, and nineteenth to twenty-first aspects; and the comparison source layout result data 4 corresponds to comparison-object layout result data of the first to fourth, seventh to tenth, thirteenth to sixteenth, and nineteenth to twenty-first aspects.

In the second exemplary embodiment, the user ID corresponds to the user identification information of the fourth, tenth, or sixteenth aspect; the client ID corresponds to the client identification information of the sixth, twelfth, or eighteenth aspect; Step S100 corresponds to the user-identification-information input device of the fourth aspect; and Step S106 corresponds to the layout-result-data registration device of the third or fourth aspect. In addition, Step S210 corresponds to the layout-element selection device of the second or twentieth aspect or layout-element selecting step of the eight, fourteenth, or twentieth aspect; and Steps S208, S212 to S216, and S224 correspond to the layout device of the second, third or twentieth aspect, or layout step of the eight, ninth, fourteenth, fifteenth, or twentieth aspect.

In the second exemplary embodiment, the comparison destination input unit 14 and Step S500 correspond to a correction-object input device of the first, second, seventh, twentieth, or twenty-first aspect; Step S500 corresponds to correction-object input device of the eighth, thirteenth, fourteenth, or nineteenth to the twenty-first aspect; and the comparison source input unit 16 and Steps S502, S504, and S514 correspond to the comparison-object input device of the first to fourth, seventh, twentieth, or twenty-first aspect. In addition, Steps S502, S504, and S15 correspond to comparison-object input device of the eighth to tenth, thirteenth to sixteenth, or nineteenth to twenty-first aspect, and the similarity calculation unit 18 and Steps S400 to S408, and S510 correspond to the layout-result-data comparison device of the first aspect or the similarity calculation device of the second, seventh, twentieth, or twenty-first aspect.

In the second exemplary embodiment, Steps S400 to S408, and S510 correspond to the similarity calculating step of the eighth, thirteenth, fourteenth, and nineteenth to twenty-first aspects; and the layout correction unit 20 and Step S512 correspond to the layout correction device of the first to third, seventh, twentieth, and twenty-first aspects; and Step S512 corresponds to the layout-correcting step of the eighth, ninth, thirteenth to fifteenth, and nineteenth to twenty-first aspects.

Figure 18:
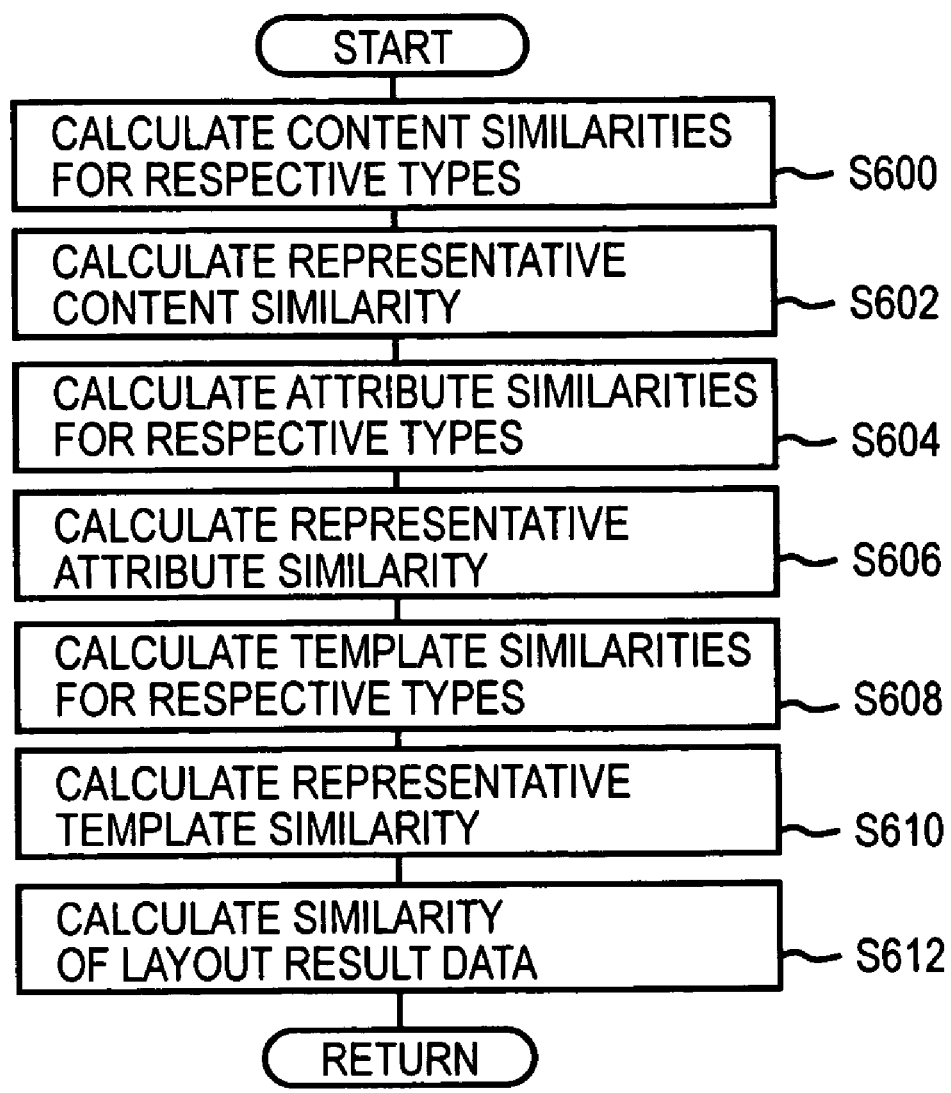
FIG. 18 is a flowchart showing similarity calculation processing in Step S306.

Now, a third exemplary embodiment of the present invention will be described with reference to the drawings. FIGS. 18 and 19A and B are schematics showing the third exemplary embodiment of a layout system, a layout program, and a layout method of the present invention.

In the exemplary embodiment, the layout system, the layout program and the layout method are adapted to a case where layout result data of automatic layout processing is corrected. The difference between the third exemplary embodiment and the first exemplary embodiment is that similarity for the layout result data is calculated based on content similarity and template similarity as well as attribute similarity. Hereinafter, the difference from the first exemplary embodiment is described. The same portions as those of the first exemplary embodiment are indicated with the same reference numerals, and the description thereof is omitted.

The CPU 30 drives predetermined programs stored in predetermined region of the ROM 32, and executes similarity calculation processing shown in a flowchart of FIG. 18 instead of the similarity calculation processing shown in the flowchart of FIG. 10 according to the programs.

FIG. 18 is the flowchart showing the similarity calculation processing in Step S306.

As shown in FIG. 18, when Step S306 is executed, the similarity calculation processing first proceeds to Step S600.

In Step S600, the content similarity between contents of layout elements of the comparison destination layout result data 2 and contents of layout elements of the comparison source layout result data 4 is calculated.

The content similarity for a title information storage frame is calculated based on contents of title information of the comparison destination layout result data 2 and contents of title information of the comparison source layout result data 4 by using a TFIDF (Term Frequency & Inverse Document Frequency) method. In a case where a plurality of character information storage frames are arranged in the comparison destination layout result data 2 or the comparison source layout result data 4, respective content similarities are calculated in a manner of round robin, and a maximum value out of these content similarities is calculated as a content similarity.

The content similarity for an image information storage frame is calculated based on contents of image information of the comparison destination layout result data 2 and the contents of image information of the comparison source layout result data 4 by using the techniques of Japanese Unexamined Patent Application Publication No. 2001-228596 and Japanese Unexamined Patent Application Publication No. 2002-297570. In a case where a plurality of image information storage frames are arranged in the comparison destination layout result data 2 or the comparison source layout result data 4, the respective content similarities are calculated in a manner of round robin, and a maximum value out of these content similarities is calculated as a content similarity.

The respective content similarities for a character information storage frame and for an illustration information storage frame can be calculated like the title information storage frame and the image information storage frame, respectively.

Next, Step S602 proceeds to calculate a representative content similarity Sim based on the calculated content similarities for the respective types by using the following Equation (2).

$$Sim = a \times S1 + b \times S2 + c \times S3 + d \times S4 \quad (2)$$

Here, in Equation (2), S1 to S4 denote the content similarities for the title information storage frame, the character information storage frame, the image information storage frame, and the illustration information storage frame, respectively, and a to d denote predetermined weighting coefficients.

Next, Step S604 proceeds to calculate attribute similarities between layout attributes of the comparison destination layout result data 2 and the layout attributes of the comparison source layout result data 4 for respective types of the information storage frames.

The attribute similarity Sim for the title information storage frame is calculated based on the area of the title information storage frame of the comparison destination layout result data 2 and the area of the title information storage frame of the comparison source layout result data 4 by using the following Equation (3).

$$Sim = 2 \times s1 \cap s2 / (s1 + s2) \quad (3)$$

Here, in Equation (3), s1 denotes the area of the title information storage frame of the comparison destination layout result data 2, s2 denotes the area of the title information storage frame of the comparison source layout result data 4, and s1∩s2 denotes the area of a region overlapped by both of the title information storage frames in a case where the comparison destination layout result data 2 and the comparison source layout result data 4 are allowed to overlap each other.

Similarly, attribute similarities for the character information storage frame, the image information storage frame, and the illustration information storage frame can be calculated by using Equation (3).

Next, Step S606 proceeds to calculate a representative attribute similarity Sim based on the calculated attribute similarities for the respective types by using the following Equation (4).

$$Sim = e \times P1 + f \times P2 + g \times P3 + h \times P4 \quad (4)$$

Here, in Equation (4), P1 to P4 denote the attribute similarities for the title information storage frame, the character information storage frame, the image information storage frame, and the illustration information storage frame, respectively, and e to h denote predetermined weighting coefficients.

Next, Step S608 proceeds to calculate template similarity between a layout template used to acquire the comparison destination layout result data 2 and a layout template used to acquire the comparison source layout result data 4 for the respective types.

The attribute similarity Sim for the title information storage frame is calculated based on the area of the title information storage frame in the layout template used to acquire the comparison destination layout result data 2 and the area of the title information storage frame in the layout template used to acquire the comparison source layout result data 4 by using the following Equation (5).

$$Sim = 2 \times s1 \cap s2 / (s1 + s2) \quad (5)$$

Here, in Equation (5), s1 denotes the area of the title information storage frame in the layout template used to acquire the comparison destination layout result data 2, s2 denotes the area of the title information storage frame in the layout template used to acquire the comparison source layout result data 4, and s1∩s2 denotes the area of a region overlapped by both of the title information storage frames in a case where the layout templates used to acquire the comparison destination layout result data 2 and the comparison source layout result data 4 are allowed to overlap each other.

Similarly, attribute similarities for the character information storage frame, the image information storage frame, and the illustration information storage frame can be calculated by using Equation (5).

Unlike the attribute similarity calculated based on contents after layout, the template similarity is calculated based on contents before layout. That is, although the arrangement positions or sizes of the information storage frames change due to the selected layout elements during the layout process, the template similarity is similarity without consideration of the change. But the attribute similarity is similarity in consideration of the change.

Next, Step S610 proceeds to calculate a representative template similarity based on the calculated template similarities for the respective types according to the following Equation (6).

$$Sim = i \times T1 + j \times T2 + k \times T3 + l \times T4 \quad (6)$$

Here, in Equation (6), T1 to T4 denote the template similarities for the title information storage frame, the character information storage frame, the image information storage frame, and the illustration information storage frame, respectively, and i to l denote predetermined weighting coefficients.

Next, Step S612 proceeds to calculate the similarity for the layout result data based on the representative attribute similarity and the representative template similarity by using the following Equation (7).

$$Sim = \alpha \times S + \beta \times P + \gamma \times T \quad (7)$$

Here, in Equation (7), S, P, and T denote the representative content similarity, the representative attribute similarity, and the representative template similarity, respectively, and α to γ denote predetermined weighting coefficients.

When Step S612 is completed, a series of processing is completed, and it returns to the initial processing.

Now, the operation of the exemplary embodiment will be described.

FIGS. 19A and B are schematics showing the comparison destination layout result data 2 and the comparison source layout result data 4.

When the automatic layout processing is completed, according to Step S300, the layout result data of the automatic layout processing is acquired as the comparison destination layout result data 2. In this case, it is assumed that the comparison destination layout result data 2 shown in FIG. 19A is acquired.

In the example of FIG. 19A, a title information storage frame to store Title 1, a character information storage frame to store Text 1, an image information storage frame to store Picture 2, a character information storage frame to store Text 3, an image information storage frame to store Picture 1, a character information storage frame to store Text 2, and an illustration information storage frame to store Illustration A are arranged in the comparison destination layout result data 2.

Next, according to Step S302, the business-type information identical to the business-type information corresponding to the input user ID is retrieved from the user information registration DB 10 to read out the user ID corresponding to the associated business-type information.

Next, according to Step S304, the comparison source layout result data 4 corresponding to the read-out user ID is read out from the layout result data registration DB 12. In this case, it is assumed that the comparison source layout result data 4 shown in FIG. 19B is read out.

In the example of FIG. 19B, a title information storage frame to store Title 2, a character information storage frame to store Text 4, an image information storage frame to store Picture 3, and an illustration information storage frame to store Illustration B are arranged in the comparison source layout result data 4.

Next, according to Step S306, similarity between the comparison destination layout result data 2 of FIG. 19A and the comparison source layout result data 4 of FIG. 19B is calculated.

First, according to Step S600, content similarities for respective types of the information storage frames are calculated.

Since the title information storage frames include the title information storage frame of Title 1 in the comparison destination layout result data 2 and the title information storage frame of Title 2 in the comparison source layout result data 4, the content similarity is a content similarity calculated by comparing the title information storage frames of Titles 1 and 2.

Since the character information storage frames include the character information storage frames of Texts 1 to 3 in the comparison destination layout result data 2 and the character information storage frames of Texts 4 and 6 in the comparison source layout result data 4, the content similarity is a maximum value of the content similarities of the following content similarities (1) to (6):

(1) Content similarity calculated by comparing the character information storage frames of Texts 1 and 4;

(2) Content similarity calculated by comparing the character information storage frames of Texts 1 and 6;

(3) Content similarity calculated by comparing the character information storage frames of Texts 2 and 4;

(4) Content similarity calculated by comparing the character information storage frames of Texts 2 and 6;

(5) Content similarity calculated by comparing the character information storage frames of Texts 3 and 4; and (6) Content similarity calculated by comparing the character information storage frames of Texts 3 and 6.

Since the image information storage frames include the image information storage frames of Pictures 1 and 2 in the comparison destination layout result data 2 and the image information storage frame of Picture 3 of the comparison source layout result data 4, the content similarity is a maximum value of the content similarities of the following content similarities (1) and (2):

(1) Content similarity calculated by comparing the image information storage frames of Pictures 1 and 3; and (2) Content similarity calculated by comparing the image information storage frames of Pictures 2 and 3

Since the illustration information storage frames include the illustration information storage frame of Illustration A in the comparison destination layout result data 2 and the illustration information storage frame of Illustration B in the comparison source layout result data 4, the content similarity is a content similarity calculated by comparing the illustration information storage frames of Illustrations A and B.

Next, according to Step S602, a representative content similarity is calculated based on the calculated content similarities for the respective types.

Similarly, according to Steps S604 and S606, the attribute similarities for the respective types of the information storage frames are calculated, and the representative attribute similarity is calculated based on the calculated attribute similarities for the respective types. According to Steps S608 and S610, the template similarities for the respective types of the information storage frames, and the representative template similarity is calculated based on the calculated template similarities for the respective types.

Next, according to Step S612, the similarity for the layout result data is calculated based on the calculated representative content similarity, representative attribute similarity, and representative template similarity.

In this way, in the exemplary embodiment, the attribute similarities are calculated based on the layout attributes of the comparison destination layout result data 2 and the layout attributes of the comparison source layout result data 4, the template similarities are calculated based on the layout templates used to acquire the comparison destination layout result data 2 and the layout templates used to acquire the comparison source layout result data 4, the content similarities are calculated based on the contents of the layout elements of the comparison destination layout result data 2 and the contents of the layout elements of the comparison source layout result data 4, and the similarity for the layout result data is calculated based on the calculated attribute similarities, template similarities, and content similarities.

As a result, since the similarity is calculated based on the layout attributes, the layout templates, and the contents of the layout elements in the information storage frames, the similarity for the layout result data can be calculated in consideration of similarities for the respective information storage frames and similarities for the contents of the layout elements. Therefore, it is possible to calculate the similarity with suitably reflecting a reader's preference in comparison with the related art.

In the third exemplary embodiment, the similarity calculation unit 18 and Steps S600 to S612, and S310 correspond to the layout-result-data comparison device of the first exemplary aspect or the similarity calculation device of the second, seventh, twentieth, and twenty-first aspects; and Steps S600 to S612, and S310 correspond to the similarity calculating step of the eighth, thirteenth, fourteenth, and nineteenth to twenty-first aspects.

Figure 20:
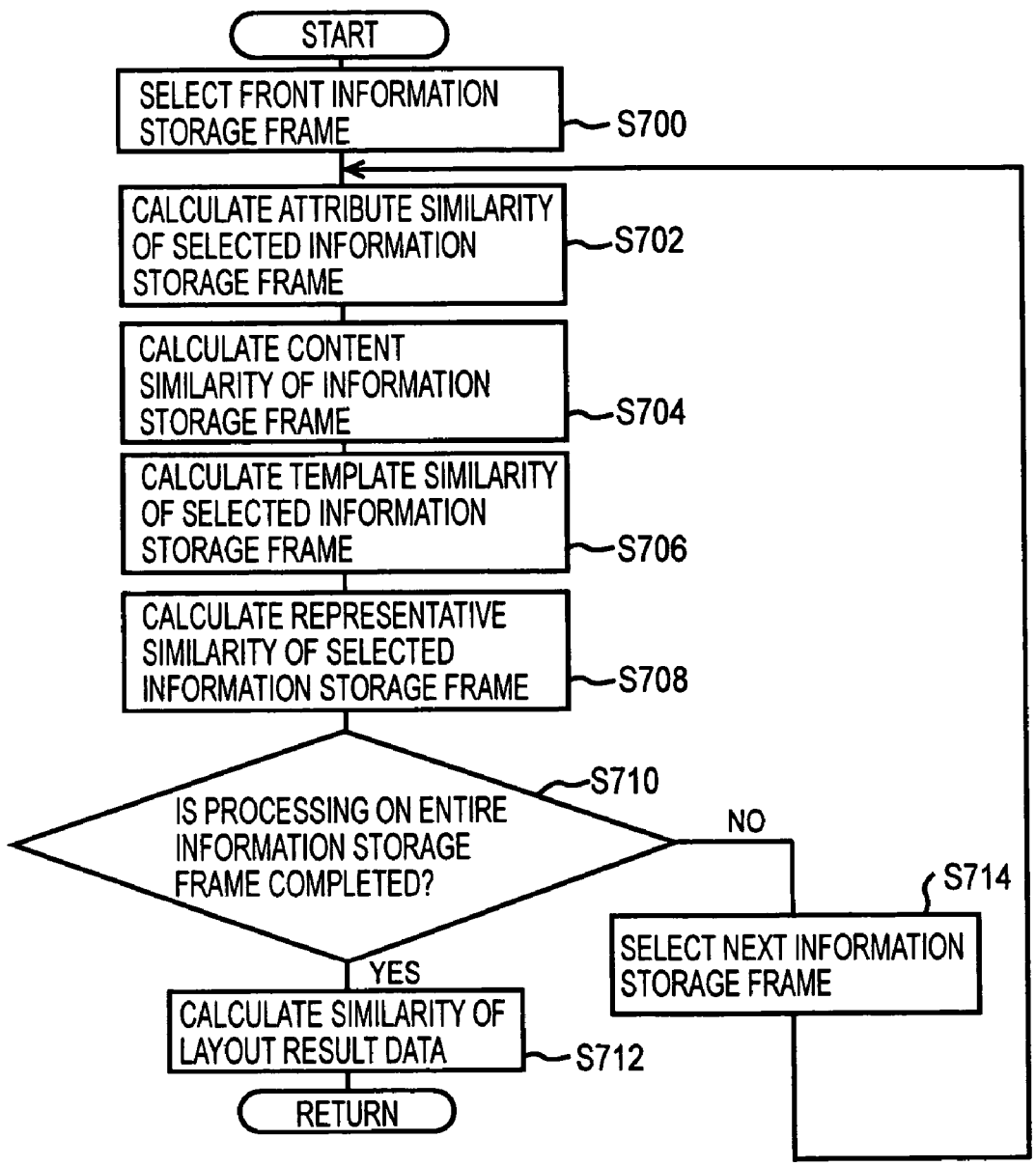
FIG. 20 is a flowchart showing similarity calculation processing in Step S306.

Now, a fourth exemplary embodiment of the present invention will be described with reference to the drawings. FIGS. 20 and 21 are schematics showing the fourth exemplary embodiment of a layout system, a layout program, and a layout method.

In the exemplary embodiment, the layout system, the layout program and the layout method is adapted to a case where layout result data of automatic layout processing is corrected. The difference between the fourth exemplary embodiment and the third exemplary embodiment is that attribute similarities, content similarities, and the template similarities for respective information storage frames of the comparison destination layout result data 2 are calculated. Hereinafter, the difference from the third exemplary embodiment is described, the same portions as those of the third exemplary embodiment are indicated with the same reference numerals, and the description thereof is omitted.

The CPU 30 drives predetermined programs stored in predetermined region of the ROM 32, and executes similarity calculation processing shown in a flowchart of FIG. 20 instead of the similarity calculation processing shown in the flowchart of FIG. 18 according to the programs.

FIG. 20 is the flowchart showing the similarity calculation processing in Step S306.

As shown in FIG. 20, when Step S306 is executed, the similarity calculation processing first proceeds to Step S700.

In Step S700, a front information storage frame is selected from the comparison destination layout result data 2, and Step S702 proceeds.

In Step S702, the attribute similarities Sim for the information storage frames selected in Steps S700 and S714 (hereinafter, a selected layout attribute) are calculated by using the following Equation (8).

$$\mathrm{Sim}=2\times s1 \cap s2/(s1+s2) \tag{8}$$

Here, in Equation (8), s1 denotes the area of the selected information storage frame, s2 denotes the area of the information storage frame of which the type is the same as that of the selected information storage frame of the comparison source layout result data 4. s1∩s2 denotes the area of a region overlapped by both of the selected information storage frames and the same type of the information storage frame in a case where the layout templates used to acquire the comparison destination layout result data 2 and the comparison source layout result data 4 are allowed to overlap each other.

Next, Step S704 proceeds to calculate the content similarities based on the contents of the layout elements stored in the selected information storage frame and the contents of the layout elements stored in the information storage frame of which the type is the same as that of the selected information storage frame in the comparison source layout result data 4 by using the TFIDF method, for example.

Next, Step S706 proceeds to calculate the template similarities based on the area of the selected information storage frame in the layout templates used to acquire comparison destination layout result data 2 and the area of the information storage frame of which the type is the same as that of the selected information storage frame in the layout templates used to acquire the comparison source layout result data 4 by using the following Equation (9).

$$\mathrm{Sim}=2\times s1 \cap s2/(s1+s2) \tag{9}$$

Here, in Equation (9), s1 denotes the area of the selected information storage frame in the layout template used to acquire the comparison destination layout result data 2. s2 denotes the area of the information storage frame of which the type is the same as that of the selected information storage frame in the layout template used to acquire the comparison source layout result data 4. s1∩s2 denotes the area of a region overlapped by both of the selected information storage frames and the information storage frame of which the type is the same as that of the selected information storage frame in a case where the layout templates used to acquire the comparison destination layout result data 2 and the comparison source layout result data 4 are allowed to overlap each other.

Next, Step S708 proceeds to calculate a representative similarity for the selected information storage frame based on the calculated attribute similarities, content similarities, and template similarities by using Equation (7).

Here, in Equation (7), S, P, and T denote the content similarity, the attribute similarity, and the template similarity, respectively, and α to γ denote predetermined weighting coefficients.

Next, Step S710 proceeds to determine whether or not the processing in Steps S702 to S708 for all information storage frames of the comparison destination layout result data 2 is completed. If it is determined that the processing for all the information storage frames is completed (Yes), Step S712 proceeds to calculate an average value of the representative similarities for the respective information storage frames as the similarity for the layout result data. Then, a series of processing is completed, and it returns to the initial processing.

In Step S710, if it is determined that the processing in Steps S702 to S708 for all the information storage frames of the comparison destination layout result data 2 is not completed (No), Step S714 proceeds to select the next information storage frame from the comparison destination layout result data 2, and Step S702 proceeds.

Now, the operation of the exemplary embodiment will be described.

FIG. 21 is a schematic showing the comparison destination layout result data 2 and the comparison source layout result data 4.

When the automatic layout processing is completed, according to Step S300, the layout result data of the automatic layout processing is acquired as the comparison destination layout result data 2. In this case, it is assumed that the comparison destination layout result data 2 shown in FIG. 21A is acquired.

In the example of FIG. 21A, a title information storage frame to store Title 1, a character information storage frame to store Text 1, a character information storage frame to store Text 3, an image information storage frame to store Picture 1, and an illustration information storage frame to store Illustration A are arranged in the comparison destination layout result data 2.

Next, according to Step S302, the business-type information identical to the business-type information corresponding to the input user ID is retrieved from the user information registration DB 10 to read out the user ID corresponding to the associated business-type information.

Next, according to Step S304, the comparison source layout result data 4 corresponding to the read-out user ID is read out from the layout result data registration DB 12. In this case, it is assumed that the comparison source layout result data 4 shown in FIG. 21B is read out.

In the example of FIG. 21B, a title information storage frame to store Title 2, a character information storage frame to store Text 4, a character information storage frame to store Text 6, an image information storage frame to store Picture 3 and an illustration information storage frame to store Illustration B are arranged in the comparison source layout result data 4.

Next, according to Step S306, similarity between the comparison destination layout result data 2 of FIG. 21A and the comparison source layout result data 4 of FIG. 21B is calculated.

First, according to Steps S700 to S706, the title information storage frame of Title 1 is selected from the comparison destination layout result data 2. The attribute similarity and the content similarity, and the template similarity for the selected title information storage frame are calculated. Since there is also the title information storage frame of Title 2 in the comparison source layout result data 4, the attribute similarity, the content similarity, and the template similarity become the content similarity calculated by comparing the title information storage frames of Titles 1 and 2. Next, according to Step S708, the representative similarity for the selected title information storage frame is calculated based on the calculated attribute similarity, content similarity, and template similarity.

Next, according to Steps S714, and S702 to S706, the character information storage frame of Text 1 is selected from the comparison destination layout result data 2. The attribute similarity and the content similarity, and the template similarity for the selected character information storage frame are calculated. Since there are the character information storage frames of Texts 4 and 6 in the comparison source layout result data 4, the attribute similarity, the content similarity, and the template similarity become a maximum value out of the content similarity calculated by comparing the character information storage frames of Texts 1 and 4 and the content similarity calculated by comparing the character information storage frames of Texts 1 and 6. Next, according to Step S708, the representative similarity for the selected character information storage frame is calculated based on the calculated attribute similarity, content similarity, and template similarity.

Similarly, according to repetition in Steps S714, and S702 to S706, the representative similarity of the character information storage frame of Text 3, the representative similarity of the image information storage frame of Picture 1 and the representative similarity of the illustration information storage frame of Illustration A, are calculated.

Next, when the representative similarities for all the information storage frames in the comparison destination layout result data 2 are calculated, according to Step S712, an average value of the representative similarities for the respective information storage frames is calculated as the similarity for the layout result data.

In this way, in the exemplary embodiment, the attribute similarities are calculated based on the layout attributes of the comparison destination layout result data 2 and the layout attributes of the comparison source layout result data 4. The template similarities are calculated based on the layout templates used to acquire the comparison destination layout result data 2 and the layout templates used to acquire the comparison source layout result data 4. The content similarities are calculated based on the contents of the layout elements of the comparison destination layout result data 2 and the contents of the layout elements of the comparison source layout result data 4. The similarity for the layout result data is calculated based on the calculated attribute similarities, template similarities, and content similarities.

As a result, since the similarity is calculated based on the layout attributes, the layout templates, the contents of the layout elements in the information storage frames, the similarity for the layout result data can be calculated in consideration of similarities for the respective information storage frames and the similarities for the contents of the layout elements. Therefore, it is possible to calculate the similarity with suitably reflecting reader's preference in comparison with the related art.

In the fourth exemplary embodiment, the similarity calculation unit 18 and Steps S700 to S714, and S310 correspond to the layout-result-data comparison device of the first aspect or the similarity calculation device of the second, seventh, twentieth, and twenty-first aspects; and Steps S700 to S714, and S310 correspond to the similarity calculating step of the eighth, thirteenth, fourteenth, and nineteenth to twenty-first aspects.

In the first exemplary embodiment, although the business-type information, identical to the business-type information corresponding to the input user ID, is retrieved from the user information registration DB 10 to read out the user ID corresponding to the associated business-type information and the comparison source layout result data 4, corresponding to the read-out user ID, is read out from the layout result data registration DB 12, but not limited thereto, a similarity relation between the business types may be set. The business-type information, similar to the business-type information corresponding to the input user ID, may be retrieved from the user information registration DB 10 to read out the user ID corresponding to the associated business-type information, and the comparison source layout result data 4, corresponding to the read-out user ID, may be read out from the layout result data registration DB 12.

In the second exemplary embodiment, although the client ID, identical to the client Id corresponding to the input user ID, is retrieved from the user information registration DB 10 to read out the user ID corresponding to the associated client ID and the comparison source layout result data 4, corresponding to the read-out user ID, is read out from the layout result data registration DB 12, but not limited thereto, a similarity relation between the clients may be set. The client ID, similar to the client ID corresponding to the input user ID, may be retrieved from the user information registration DB 10 to read out the user ID corresponding to the associated client ID, and the comparison source layout result data 4, corresponding to the read-out user ID, may be read out from the layout result data registration DB 12.

In the first exemplary embodiment, although usage of the date of use of the user information registration DB 420 is not particularly described, instead of the comparison source layout result data 4 read out based on the business-type information, the comparison source layout result data 4 used within a time interval from a predetermined past date to the current date (for example, within a time interval of past one year) may be considered to be a competitive one. The comparison source layout result data 4 within the associated time interval may be read out based on the date of use and the current data in order to be used. For example, in case of user "USER 1" of the use history information registration table 440 of FIG. 6, although "Layout 1/USER 1: Oct. 23, 2002" and "Layout 4/USER 1: Feb. 14, 2003" are registered, the comparison source layout result data 4, of which date of use is November, 2003 and one or more years ago, is not considered to be competitive.

As a result, it is possible to reduce the likelihood or prevent the same layout result data from being immediately generated, and to implement a layout with a high individuality even in case of small layout result data.

Similarly, such modification may be carried out in the second exemplary embodiment.

In the first exemplary embodiment, although the similarity for the layout result data is calculated based on the layout attribute of the comparison destination layout result data 2 and the layout attribute of the comparison source layout result data 4, but not limited thereto, the following constructions may be available.

As a first construction, the attribute similarity is calculated based on the layout attribute of the comparison destination layout result data 2 and the layout attribute of the comparison source layout result data 4, type similarity is calculated based on a type of the information storage frame of the comparison destination layout result data 2 and a type of information storage frame of the comparison source layout result data 4, and the similarity for the layout result data is calculated based on the calculated attribute similarity and the calculated type similarity.

As a result, since the similarity is calculated based on the layout attribute and the type of the information storage frame, the similarity for the layout result data can be calculated in consideration of similarities for respective information storage frames. Therefore, it is possible to calculate the similarity with suitably reflecting a reader's preference in comparison with the related art.

As a second construction, the attribute similarity is calculated based on the layout attribute of the comparison destination layout result data 2 and the layout attribute of the comparison source layout result data 4. Content similarity is calculated based on contents of the storage information of the comparison destination layout result data 2 and contents of storage information of the comparison source layout result data 4. The similarity for the layout result data is calculated based on the calculated attribute similarity and the calculated content similarity.

As a result, since the similarity is calculated based on the layout attribute of the information storage frame and the contents of the storage information, the similarity for the layout result data can be calculated in consideration of similarities for respective information storage frames and similarities for the contents of the storage information. Therefore, it is possible to calculate the similarity with suitably reflecting a reader's preference in comparison with the related art.

In the first exemplary embodiment, although the attribute similarity of the selected layout attribute for the respective types of the information storage frames is calculated, but not limited thereto, the attribute similarities for the respective layout attributes may be calculated regardless of the types of the information storage frames.

In the first exemplary embodiment, although a function max to take a maximum value and the attribute similarities for the respective layout attributes are calculated by using the function, but not limited thereto, a function to indicate a degree of influence on a reader's preference may be prepared, and the attribute similarities for the respective layout attributes may be calculated by using the function.

In the first exemplary embodiment, although the layout attributes of the layout attribute table 400 of FIG. 4 are used as the layout attributes, but not limited thereto, a jump ratio, a black ratio, a pictorial plate ratio, or the like may be used.

In the third exemplary embodiment, predetermined weighting coefficients are used. Specifically, if weight of an image or an illustration with a high degree of visual perception, as an example of the weighting coefficients, is enlarged, it is possible to calculate the similarity more agreeable to human's sense.

In the third and fourth exemplary embodiments, although the similarity of the layout result data is calculated by adding the results of weighting, but not limited thereto, the similarity of the layout result data may be calculated by taking an average value of the results of weighting or performing other calculation methods.

In the third exemplary embodiment, although both sizes and arrangement positions of the information storage frames are considered to calculate the attribute similarity, but not limited thereto, arrangement position similarity may be calculated by obtaining respective similarities for the sizes and the arrangement positions and performing an averaging or weighting operation.

As a result, it is possible to calculate the similarity with suitably reflecting a reader's preference.

In the third and fourth exemplary embodiments, although the content similarity is calculated by using the TFIDF method, but not limited thereto, the content similarity may be calculated by using notational similarity or content similarity being likely to have an larger influence on appearance, such as a lot of HIRAGANA characters and a lot of blanks.

In the first to fourth exemplary embodiments, although the layout result data of the automatic layout processing is corrected, but not limited thereto, for example, the layout result data that is directly designed by a designer may be corrected.

In the first to fourth exemplary embodiments, although the user information registration DB 10, the layout result data registration DB 12, the layout element registration DB 40 and the template registration DB 42 are prepared as external devices of the layout apparatus 100, but not limited thereto, these DBs may be installed in arbitrary terminals on a network, and the layout apparatus 100 and the terminals may be connected though the network, so that the layout apparatus 100 may utilize the DBs of the terminals. In a case where it is constructed as a network system, the following constructions are considered.

(1) The processing in Step S102 is constructed to be performed in a network terminal, the layout apparatus 100 and the network terminal are connected through the network, and the layout apparatus 100 allows the network terminal to perform the processing in Step S102 and obtains the results of performing the processing from the network terminal. This is the construction that allows the network terminal to performing the automatic layout processing.

(2) The processing in Steps S306 and S406 are constructed to be performed in a network terminal, the layout apparatus 100 and the network terminal are connected through the network, and the layout apparatus 100 allows the network terminal to perform the processing in Steps S306 and S406 and obtains the results of performing the processing from the network terminal. This is the construction that allows the network terminal to performing the similarity calculation processing.

(3) The processing in Steps S312 and S412 are constructed to be performed in a network terminal, the layout apparatus 100 and the network terminal are connected through the network, and the layout apparatus 100 allows the network terminal to perform the processing in Steps S312 and S412 and obtains the results of performing the processing from the network terminal. This is the construction that allows the network terminal to performing the layout correction process.

(4) The processing in Steps S300, S304, S314, S400, S404, and S414 are constructed to be performed in a network terminal, the layout apparatus 100 and the network terminal are connected through the network, and the layout apparatus 100 allows the network terminal to perform the processing in Steps S300, S304, S314, S400, S404, and S414, and obtains the results of performing the processing from the network terminal. This is the construction that allows the network terminal to performing the layout result data input process.

In the first to fourth exemplary embodiments, in a case where the processing shown in the flowcharts of FIGS. 7, 8, 9, 10, 17, 18, and 20 are performed, although the control program stored in the ROM 32 in advance are executed, but not limited thereto, a program indicating a sequence thereof may

What is claimed is:

1. A layout system, comprising:
   a layout-element selection device to select a layout element from a layout-element storage device to store a plurality of the layout elements;
   a layout device to arrange the layout element selected by the layout-element selection device in a predetermined layout region;
   a correction-object input device to input layout result data of the layout device as correction-object layout result data;
   a comparison-object input device to input comparison-object layout result data as an object to be compared;
   a similarity calculation device to calculate similarity between the correction-object layout result data input by the correction-object input device and the comparison-object layout result data input by the comparison-object input device; and
   a layout correction means device to correct the correction-object layout result data input by the correction-object input device based on the similarity calculated by the similarity calculation device, the layout correction device correcting the correction-object layout result data so that the degree of correction of the correction-object layout result data increases as the similarity calculated by the similarity calculation device increases.

2. The layout system, according to claim 1, further comprising:
   a layout-result-data registration device to register in a layout-result-data storage device the layout result data of the layout device or the correction-object layout result data corrected by the layout correction device as the comparison-object layout result data, the comparison-object input device reading out the correction-object layout result data from the layout-result-data storage device.

3. The layout system according to claim 2, further comprising:
   a user-information storage device to store user information on a user in correspondence with user identification information; and
   a user-identification-information input device to input the user identification information,
   the layout-result-data registration device registering the comparison-object layout result data in the layout-result-data storage device in correspondence with the user identification information input by the user-identification-information input device, and the comparison-object input device retrieving user information identical to or similar to the user information corresponding to the user identification information input by the user-identification-information input device from the user-information storage device to read out user identification information corresponding to the associated user information, and reading out comparison-object layout result data corresponding to the read-out user identification information from the layout-result-data storage device.

4. The layout system according to claim 3, the user information including business-type information indicating a business type in which the user is engaged.

5. The layout system according to claim 3, the user information including client identification information to identify clients managed by the user.

6. A layout system, comprising:
   a correction-object input device to input correction-object layout result data as an object to be corrected;
   a comparison-object input device to input comparison-object layout result data as an object to be compared;
   a similarity calculation device to calculate similarity between the correction-object layout result data input by the correction-object input device and the comparison-object layout result data input by the comparison-object input device; and
   a layout correction device to correct the correction-object layout result data input by the correction-object input device based on the similarity calculated by the similarity calculation device,
   the layout correction device correcting the correction-object layout result data so that the degree of correction of the correction-object layout result data increases as the similarity calculated by the similarity calculation device increases.

7. A computer readable medium that stores computer readable layout program executed by a computer, the program comprising:
   a layout-element selecting program for selecting a layout element from a layout-element storage device to store a plurality of the layout elements;
   a layout program for arranging the layout element selected by the layout-element selecting program in a predetermined layout region;
   a correction-object inputting program for inputting layout result data obtained by the layout program as correction-object layout result data;
   a comparison-object inputting program for inputting comparison-object layout result data as an object to be compared;
   a similarity calculating program for calculating similarity between the correction-object layout result data input by the correction-object inputting program and the comparison-object layout result data input by the comparison-object inputting program; and
   a layout-correcting program for correcting the correction-object layout result data input by the correction-object inputting program based on the similarity calculated by the similarity calculating program,
   the correction-object layout result data being corrected by the layout-correcting program so that the degree of correction of the correction-object layout result data increases as the similarity calculated by the similarity calculating program increases.

8. A layout program method, comprising:
   a layout-element selecting step of selecting a layout element from a layout-element storage device to store a plurality of the layout elements;

a layout step of arranging the layout element selected by the layout-element selecting step in a predetermined layout region;

a correction-object inputting step of inputting layout result data obtained in the layout step as correction-object layout result data;

a comparison-object inputting step of inputting comparison-object layout result data as an object to be compared;

a similarity calculating step of calculating similarity between the correction-object layout result data input in the correction-object inputting step and the comparison-object layout result data input in the comparison-object inputting step; and a layout-correcting step of correcting the correction-object layout result data input in the correction-object inputting step based on the similarity calculated in the similarity calculating step, the correction-object layout result data being corrected in the layout-correcting step so that the degree of correction of the correction-object layout result data increases as the similarity calculated in the similarity calculating step increases.

9. A layout method, comprising:

a layout-element selecting step of allowing a layout-element selection device to select a layout element from a layout-element storage device for storing a plurality of the layout elements;

a layout step of allowing a layout device to arrange the layout element selected in the layout-element selecting step in a predetermined layout region;

a correction-object inputting step of allowing a correction-object input device to input layout result data obtained in the layout step as correction-object layout result data;

a comparison-object inputting step of allowing a comparison-object input device to input comparison-object layout result data as an object to be compared;

a similarity calculating step of allowing a similarity calculation device to calculate similarity between the correction-object layout result data input in the correction-object inputting step and the comparison-object layout result data input in the comparison-object inputting step; and a layout-correcting step of allowing a layout correction device to correct the correction-object layout result data input in the correction-object inputting step based on the similarity calculated in the similarity calculating step, the correction-object layout result data being corrected in the layout-correcting step so that the degree of correction of the correction-object layout result data increases as the similarity calculated in the similarity calculating step increases.

10. A layout method, comprising:

a correction-object inputting step of allowing a correction-object input device to input correction-object layout result data as an object to be corrected;

a comparison-object inputting step of allowing a comparison-object input device to input comparison-object layout result data as an object to be compared;

a similarity calculating step of allowing similarity calculation device to calculate similarity between the correction-object layout result data input in the correction-object inputting step and the comparison-object layout result data input in the comparison-object inputting step; and a layout-correcting step of an allowing layout correction device to correct the correction-object layout result data input in the correction-object inputting step based on the similarity calculated in the similarity calculating step, the correction-object layout result data being corrected in the layout-correcting step so that the degree of correction of the correction-object layout result data increases as the similarity calculated in the similarity calculating step increases.

* * * * *